US012584756B1

(12) United States Patent
Robb

(10) Patent No.: US 12,584,756 B1
(45) Date of Patent: Mar. 24, 2026

(54) GENERATIVE MODEL FOR ROUTE RECOMMENDATION

(71) Applicant: Strava, Inc., San Francisco, CA (US)

(72) Inventor: Drew Robb, San Francisco, CA (US)

(73) Assignee: Strava, Inc., San Francisco, CA (US)

( * ) Notice: Subject to any disclaimer, the term of this patent is extended or adjusted under 35 U.S.C. 154(b) by 0 days.

(21) Appl. No.: 19/173,517

(22) Filed: Apr. 8, 2025

Related U.S. Application Data

(60) Provisional application No. 63/737,478, filed on Dec. 20, 2024.

(51) Int. Cl.
  *G01C 21/36* (2006.01)
  *G01C 21/00* (2006.01)
  *G01C 21/34* (2006.01)

(52) U.S. Cl.
  CPC ..... *G01C 21/3617* (2013.01); *G01C 21/3423* (2013.01); *G01C 21/3446* (2013.01); *G01C 21/3804* (2020.08)

(58) Field of Classification Search
  CPC ........... G01C 21/3446; G01C 21/3617; G01C 21/00; G06N 3/00
  USPC .................................................. 701/400–541
  See application file for complete search history.

(56) References Cited

U.S. PATENT DOCUMENTS

| | | | | |
|---|---|---|---|---|
| 2013/0345978 | A1* | 12/2013 | Lush | G01C 21/3461 701/533 |
| 2015/0160026 | A1* | 6/2015 | Kitchel | G01C 21/3667 701/533 |

| | | | | |
|---|---|---|---|---|
| 2016/0161273 | A1* | 6/2016 | Kitchel | G01S 19/19 701/454 |
| 2016/0346611 | A1* | 12/2016 | Rowley | G01S 19/19 |
| 2018/0045524 | A1* | 2/2018 | Kitchel | A63B 24/0062 |
| 2020/0217680 | A1* | 7/2020 | Dewan | G01C 21/343 |
| 2020/0309545 | A1* | 10/2020 | Michel | G08G 1/005 |
| 2021/0095974 | A1* | 4/2021 | Bondi | G01C 21/3629 |
| 2025/0148911 | A1* | 5/2025 | Chandraker | G06N 3/08 |
| 2025/0198790 | A1* | 6/2025 | Tran | G06N 20/00 |

FOREIGN PATENT DOCUMENTS

| | | | | | |
|---|---|---|---|---|---|
| CN | 118014173 | A | * | 5/2024 | G06Q 50/26 |
| WO | WO-2025019142 | A1 | * | 1/2025 | G06N 3/088 |

OTHER PUBLICATIONS

Nvidia A40 Datasheet, Mar. 22, 2022.*
J. Liang, A. Payandeh, D. Song, X. Xiao and D. Manocha, "DTG : Diffusion-based Trajectory Generation for Mapless Global Navigation," 2024 IEEE/RSJ International Conference on Intelligent Robots and Systems (IROS), Abu Dhabi, United Arab Emirates, 2024, pp. 5340-5347, (Year: 2024).*

(Continued)

*Primary Examiner* — Erin M Piateski
*Assistant Examiner* — Paul Allen
(74) *Attorney, Agent, or Firm* — Van Pelt, Yi & James LLP

(57) ABSTRACT

Using a generative model for route recommendation is disclosed, including: receiving a request to generate a route recommendation for an activity; and generating a recommended route for the activity in response to the request using a diffusion machine learning model, wherein the diffusion machine learning model is trained to generate routes based at least in part on a plurality of recorded user activities.

17 Claims, 15 Drawing Sheets

(56)　　　　　　　　References Cited

OTHER PUBLICATIONS

T. Wei et al., "Diff-RNTraj: A Structure-Aware Diffusion Model for Road Network-Constrained Trajectory Generation," in IEEE Transactions on Knowledge and Data Engineering, vol. 36, No. 12, pp. 7940-7953, Dec. 2024, (Year: 2024).*

Bergmann, Dave; Stryker, Cole; "What are diffusion models?" IBM.com, Aug. 21, 2024 (Year: 2024).*

Wang, Zheng—English description of CN-118014173-A via Espacenet Patent translate, retrieved Jun. 2, 2025. (Year: 2025).*

Peebles et al. "Scalable diffusion models with transformers." Proceedings of the IEEE/CVF international conference on computer vision. 2023.

* cited by examiner

Generative Route Recommendation Server

208

302 — Training Data Storage

304 — Reference Map Storage

306 — Reference Map Cropping Engine

308 — Diffusion Transformer Model Training Engine

310 — Diffusion Transformer Model Parameter Storage

312 — Inference Engine

314 — Route Conversion Engine

400 ⌐

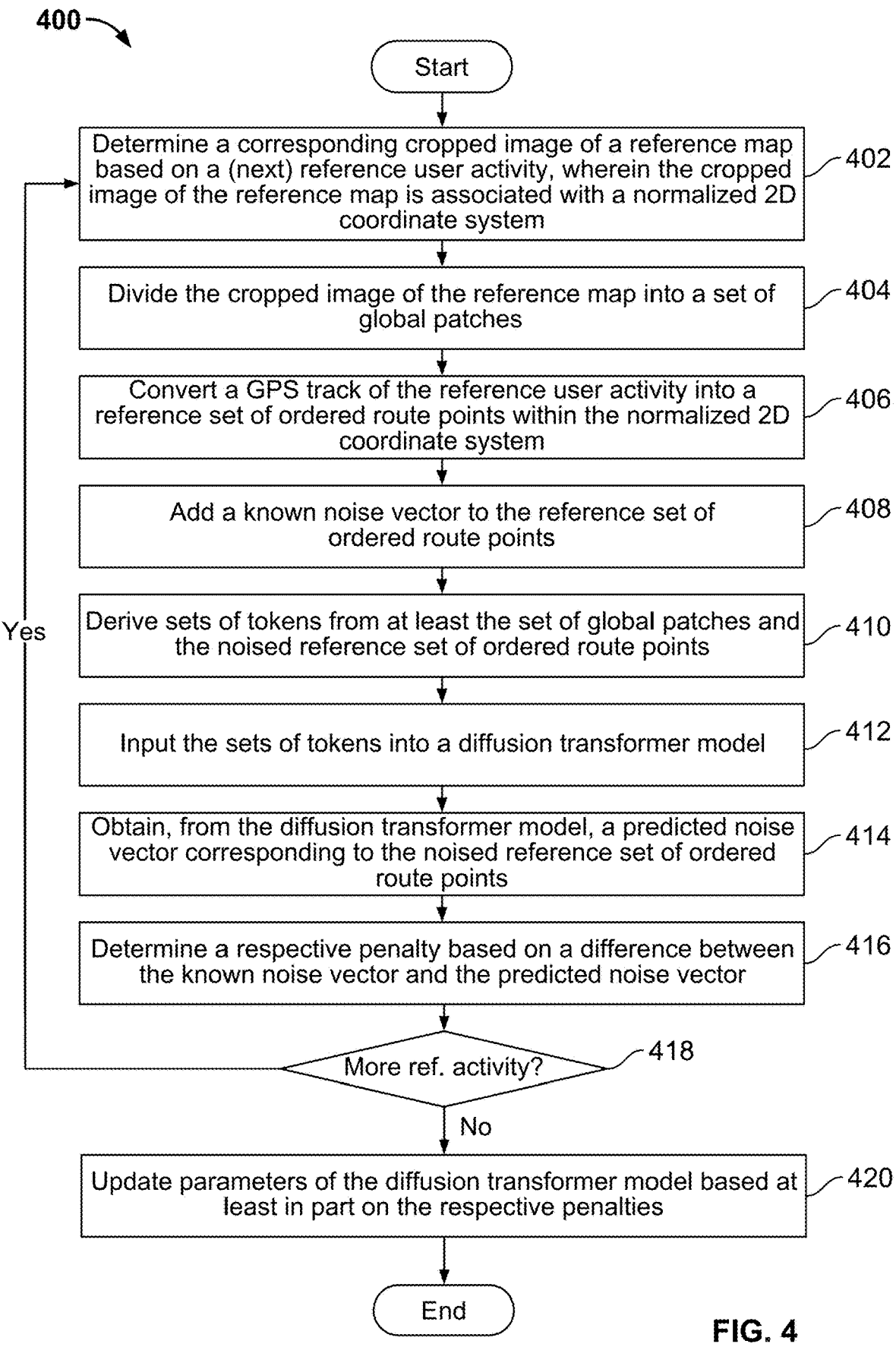

Start

Determine a corresponding cropped image of a reference map based on a (next) reference user activity, wherein the cropped image of the reference map is associated with a normalized 2D coordinate system — 402

Divide the cropped image of the reference map into a set of global patches — 404

Convert a GPS track of the reference user activity into a reference set of ordered route points within the normalized 2D coordinate system — 406

Add a known noise vector to the reference set of ordered route points — 408

Derive sets of tokens from at least the set of global patches and the noised reference set of ordered route points — 410

Input the sets of tokens into a diffusion transformer model — 412

Obtain, from the diffusion transformer model, a predicted noise vector corresponding to the noised reference set of ordered route points — 414

Determine a respective penalty based on a difference between the known noise vector and the predicted noise vector — 416

More ref. activity? — 418

Yes

No

Update parameters of the diffusion transformer model based at least in part on the respective penalties — 420

End

FIG. 4

500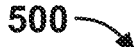

502

Receive an indication to generate a crop of a reference map corresponding to a reference user activity, wherein the indication includes at least GPS data associated with the reference user activity and an activity type associated with the reference user activity

504

Determine a reference map based on the activity type

506

Determine dimensions of a cropped map image based on a distance determined from the GPS data

508

Determine a center of the cropped map image based on a start location associated with the GPS data

510

Generate the cropped map image from the reference map based on the determined dimensions and the determined center

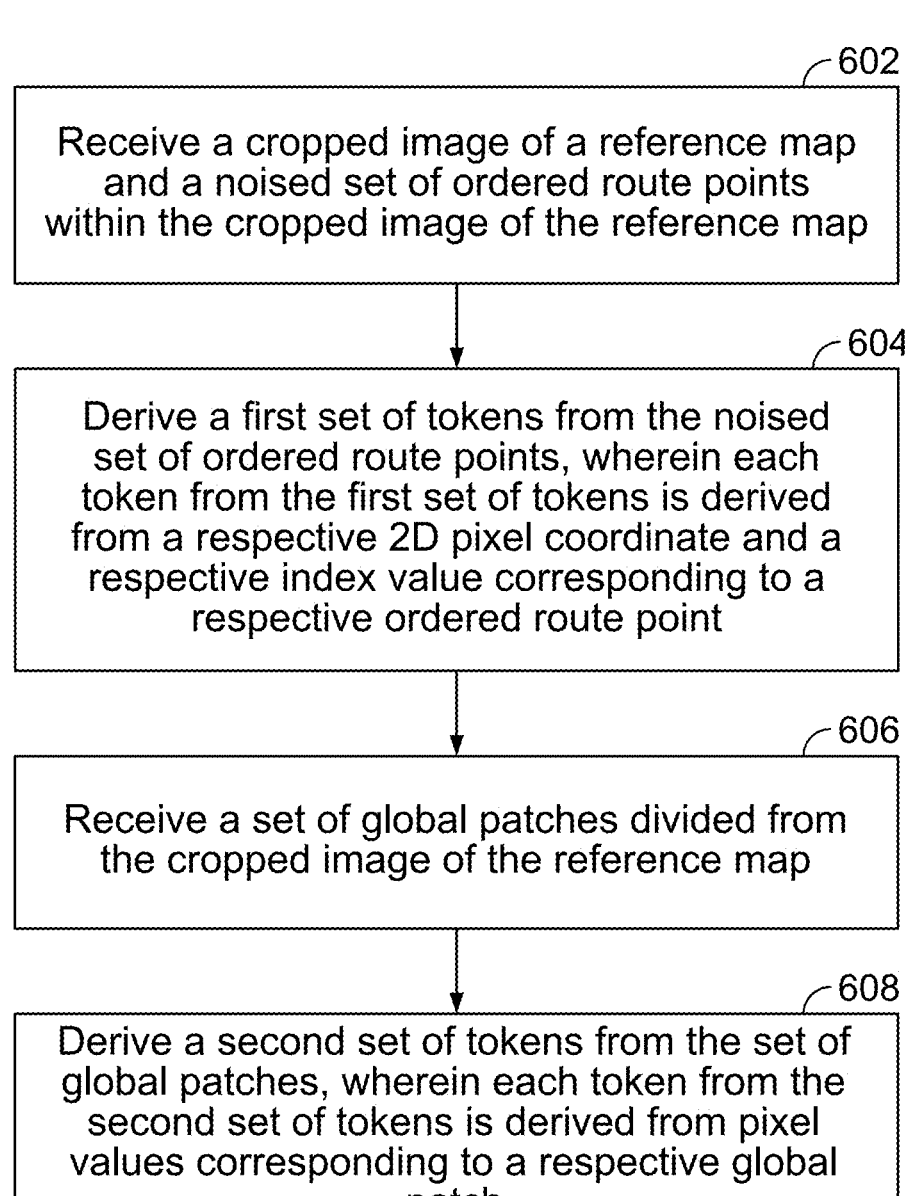

602

Receive a cropped image of a reference map and a noised set of ordered route points within the cropped image of the reference map

604

Derive a first set of tokens from the noised set of ordered route points, wherein each token from the first set of tokens is derived from a respective 2D pixel coordinate and a respective index value corresponding to a respective ordered route point

606

Receive a set of global patches divided from the cropped image of the reference map

608

Derive a second set of tokens from the set of global patches, wherein each token from the second set of tokens is derived from pixel values corresponding to a respective global patch

FIG. 6

800

┌─────────────────────────────────────────┐ ⌐802
│                                         │
│   Receive a request to generate a route  │
│     recommendation for an activity       │
│                                         │
└─────────────────────────────────────────┘
                    │
                    ▼
┌─────────────────────────────────────────┐ ⌐804
│                                         │
│   Generate a recommended route for the   │
│  activity in response to the request using a │
│  diffusion machine learning model, wherein  │
│   the diffusion machine learning model is   │
│  trained to generate routes based at least in │
│  part on a plurality of recorded user activities │
│                                         │
└─────────────────────────────────────────┘

FIG. 8

900

Start

902 — Receive a request to generate a recommended route

904 — Use parameters of the request to generate a cropped map image from a reference map 906 — Divide the cropped map image into a set of global patches 908 — For an initial step of inference of a diffusion transformer model, generate a set of pure noise route points within the cropped map image 910 — Set the set of pure noise route points as a noised input set of predicted route points corresponding to a current step 912 — Derive sets of tokens from at least the set of global patches and the noised input set of predicted route points 914 — Input the sets of tokens into the diffusion transformer model 916 — Obtain, from the diffusion transformer model, a predicted noise vector corresponding to the current step 918 — Determine an output set of predicted route points corresponding to the current step based on the noised input set of predicted route points and the predicted noise vector corresponding to the current step 920 — More step(s)?

922 — Start a (new) current step

924 — Set the output set of predicted route points corresponding to the previous step as an input set of predicted route points corresponding to the current step 926 — Add a new noise level associated with the current step to the input set of predicted route points corresponding to the current step Yes No 928 — Determine the output set of predicted route points corresponding to the current step as a recommended route representation

End

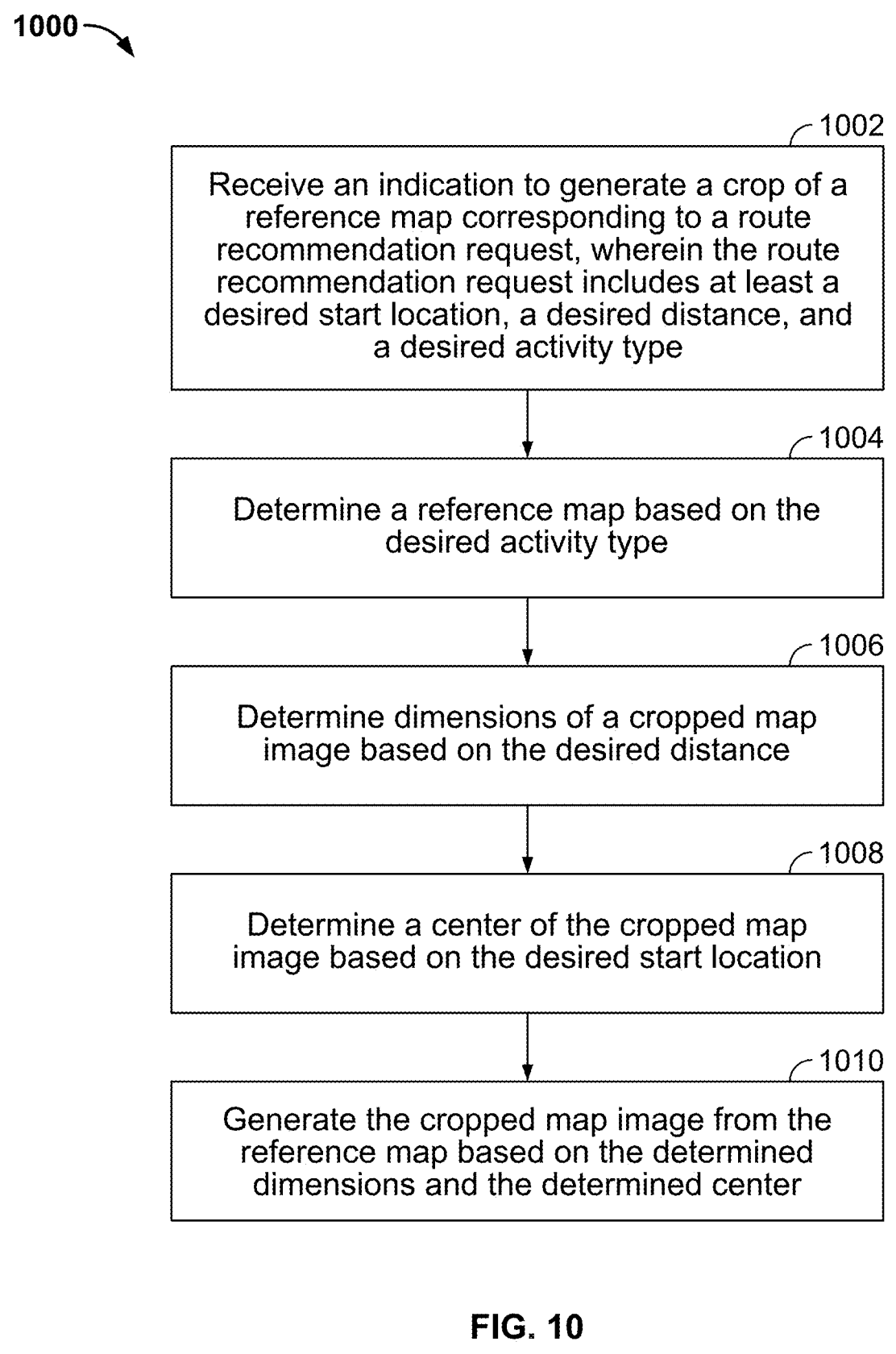

Receive an indication to generate a crop of a reference map corresponding to a route recommendation request, wherein the route recommendation request includes at least a desired start location, a desired distance, and a desired activity type

⌐ 1004

Determine a reference map based on the desired activity type

⌐ 1006

Determine dimensions of a cropped map image based on the desired distance

⌐ 1008

Determine a center of the cropped map image based on the desired start location

⌐ 1010

Generate the cropped map image from the reference map based on the determined dimensions and the determined center

FIG. 10

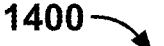
1400
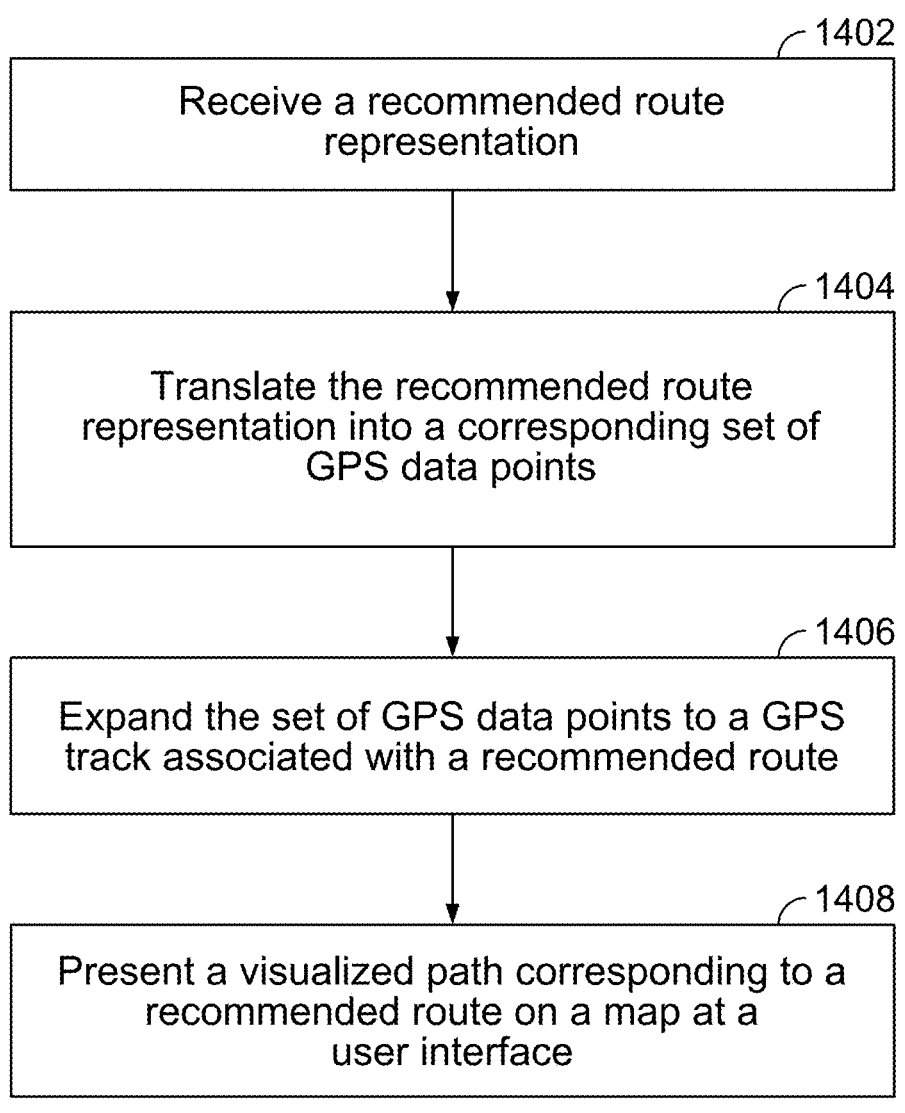
1402
Receive a recommended route
representation
1404
Translate the recommended route
representation into a corresponding set of
GPS data points
1406
Expand the set of GPS data points to a GPS
track associated with a recommended route
1408
Present a visualized path corresponding to a
recommended route on a map at a
user interface
FIG. 14

GENERATIVE MODEL FOR ROUTE RECOMMENDATION

CROSS REFERENCE TO OTHER APPLICATIONS

This application claims priority to U.S. Provisional Patent Application No. 63/737,478 entitled GENERATIVE MODEL FOR ROUTE RECOMMENDATION filed Dec. 20, 2024 which is incorporated herein by reference for all purposes.

BACKGROUND OF THE INVENTION

A "route" refers to a geographical path along which a user can potentially perform a new activity. For example, routes may be generated and then presented to a user as novel or interesting paths along which to perform future athletic activities. However, it is a challenge to generate a large volume of routes that vary in shape but also satisfy a desired set of attributes.

BRIEF DESCRIPTION OF THE DRA WINGS

Various embodiments of the invention are disclosed in the following detailed description and the accompanying drawings.

FIG. 4 is a flow diagram showing an example of a process for training a diffusion transformer model to act as a route recommendation model in accordance with some embodiments.

FIG. 5 is a flow diagram showing an example of a process for generating a cropped image of a reference map corresponding to a reference user activity during training of a diffusion transformer model in accordance with some embodiments.

FIG. 6 is a flow diagram showing an example of a process for deriving tokens from a set of ordered route points and a corresponding cropped image of a reference map in accordance with some embodiments.

FIG. 8 is a flow diagram showing an embodiment of a process for using a diffusion machine learning model for route recommendation.

FIG. 9 is a flow diagram showing an example of a process for performing inference with a diffusion machine learning model for route recommendation in accordance with some embodiments.

FIG. 10 is a flow diagram showing an example of a process for generating a cropped image of a reference map corresponding to a recommendation route request by running a diffusion transformer model at inference in accordance with some embodiments.

Figure 12:
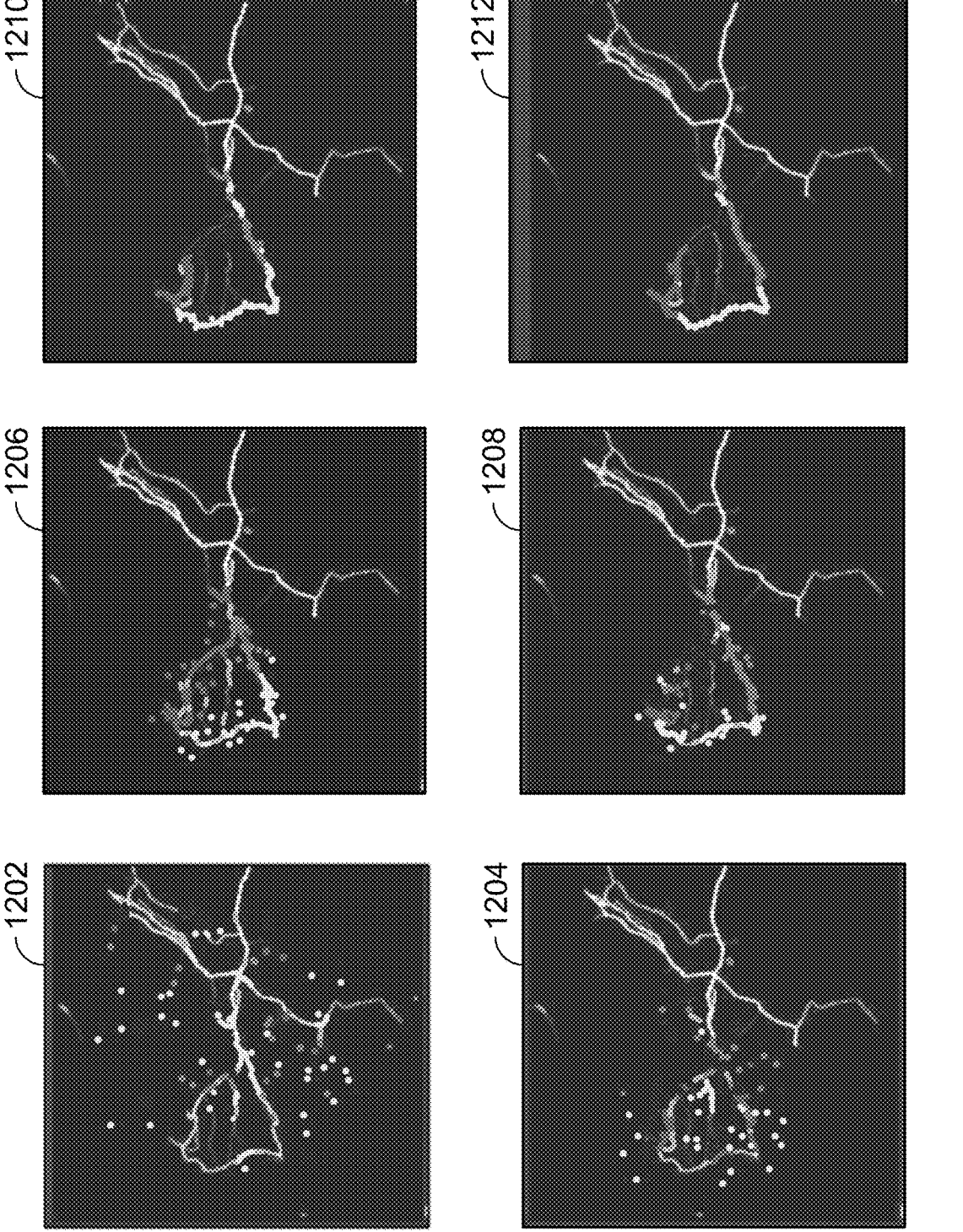

FIG. 12 includes six diagrams that show examples of six respective sets of predicted ordered route points that are output from six different steps of inference with the diffusion transformer model in response to a route recommendation request.

Figure 13:
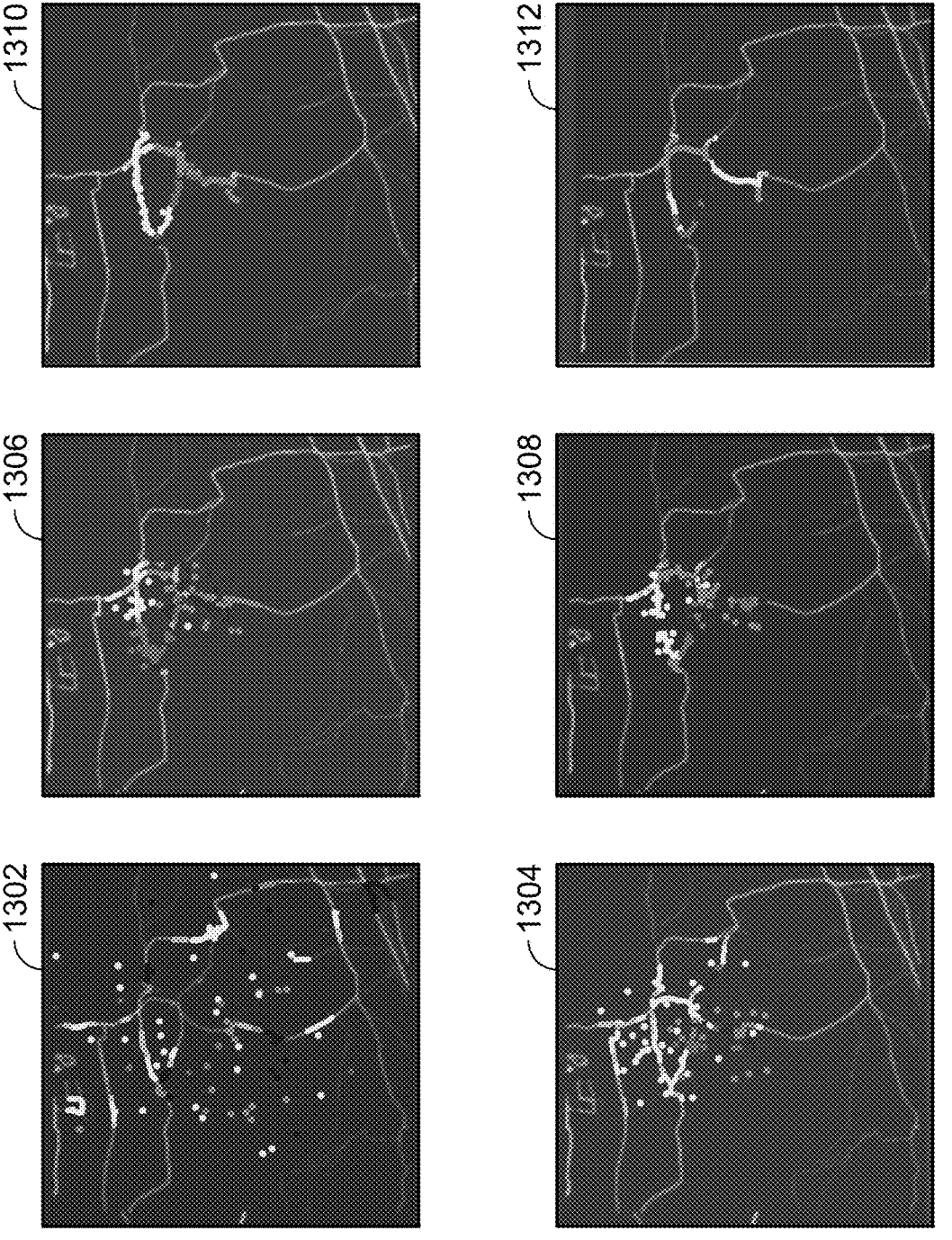

FIG. 13 includes six diagrams that show examples of six respective sets of predicted ordered route points that are output from six different steps of inference with the diffusion transformer model in response to a route recommendation request.

FIG. 14 is a flow diagram showing an example process for generating a final route from a representation of a recommended route in accordance with some embodiments.

Figure 15:

FIG. 15 is a diagram showing an example presentation of a recommended full route generated using a generative model at a user interface in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In one system, a route is generated by picking a start location and a pair of two waypoints and then using a set of heuristics (e.g., desired distance, quality/popularity of path to get there, elevation, distance from other waypoints, randomness, etc.) to generate a loop based on the given points. For example, the waypoints are picked at a distance such that the expected length of the route would match the requested length, and biased towards areas of higher popularity. The route would then be generated from point-to-point to route a triangle starting from the user's location, visiting the two waypoints, and then returning. The primary problem with this approach is the limitations imposed by using only two waypoints plus other heuristics that try to return a loop-shaped route.

Figure 1:
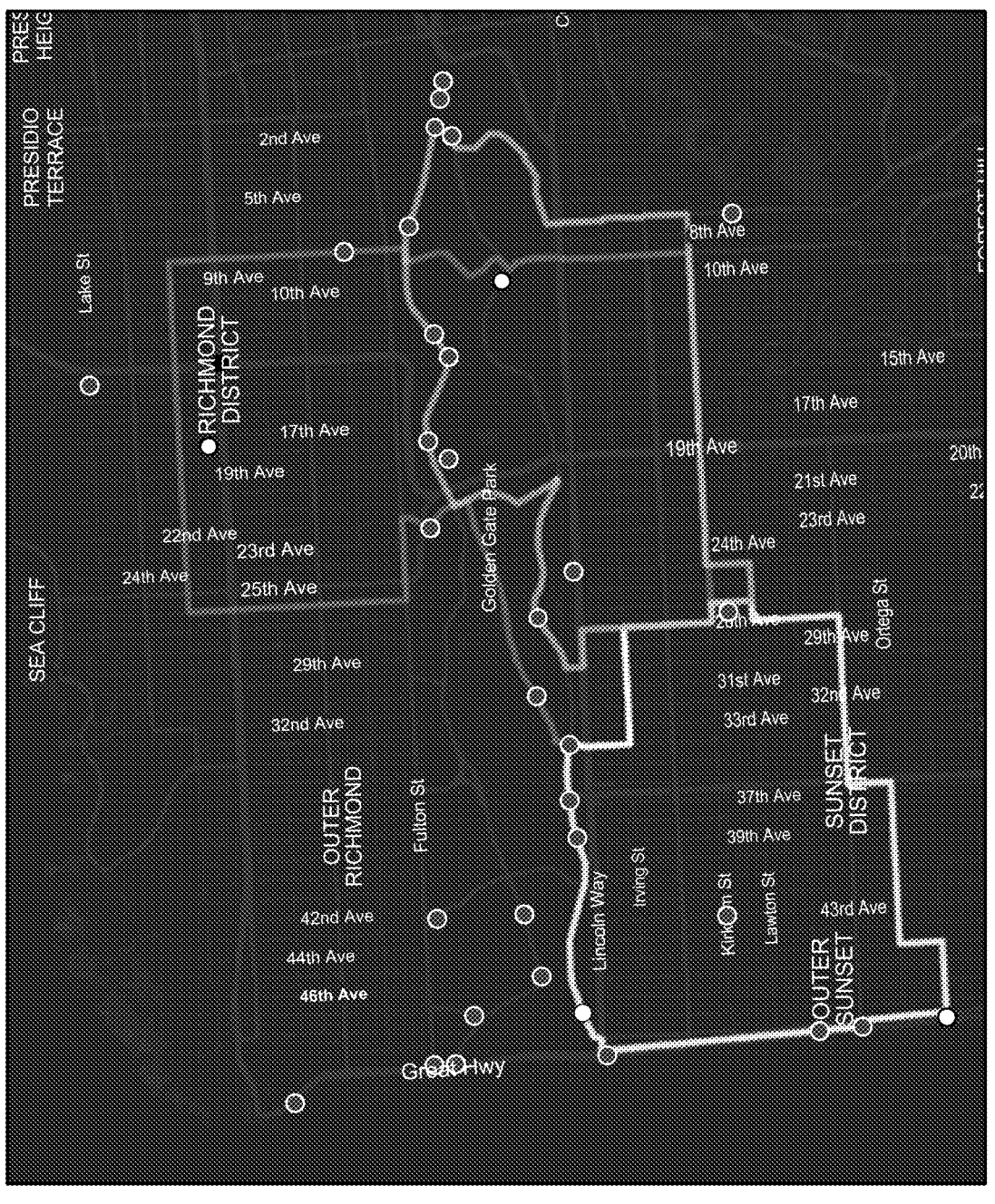
FIG. 1 is a diagram showing three different, loop-shaped routes generated from a designated start location and two waypoints.

FIG. 1 is a diagram showing three different, loop-shaped routes generated from a designated start location and two waypoints.

A loop shaped route works very well for many use cases, especially where:

There is enough space such that a single loop can fulfill a desired distance.

There is a dense network of trails/roads so that many distinct loops can be found.

However, outside of these situations, this technique can perform poorly. Some weaknesses of the two way-points and heuristics-based technique are:

In sports like mountain biking, most routes have complicated topology more than a single loop.

For very long routes, the number of traversed edges is high, and latency can be an issue with this approach.

Often the selected waypoint is good, but there is not actually a preferential matching route to the waypoint, but the algorithm forces completion of the route and always returns a loop.

Therefore, it would be desirable to determine a different and efficient technique to generate routes that can be of arbitrary shape/topology but nevertheless meet desired attributes.

Embodiments of using a generative model for route recommendation are described herein. A request to generate a route recommendation for an activity is received. For example, the type of activity (e.g., sport) can be a run, a bike ride, a swim, a hike, a walk, or a ski-based activity. For example, the request may have been originated by a user via a user interface or programmatically generated for the user in response to a user navigating to a particular page on a website or application. In some embodiments, the request includes one or more parameters. Example request parameters include one or more of the following: a desired start location, a desired end location, and a desired activity type. A route recommendation is generated for the activity in response to the request using a diffusion machine learning model, wherein the diffusion machine learning model has been trained to generate routes based on a plurality of recorded user activities.

As will be described in further detail below, using a reference map as context, a generative model, that has been trained on historical recorded user activity data, can create (predict) "routes" that are indistinguishable from actual activities recorded by athletes that would solve the route recommendation problem that was described above.

Figure 2:
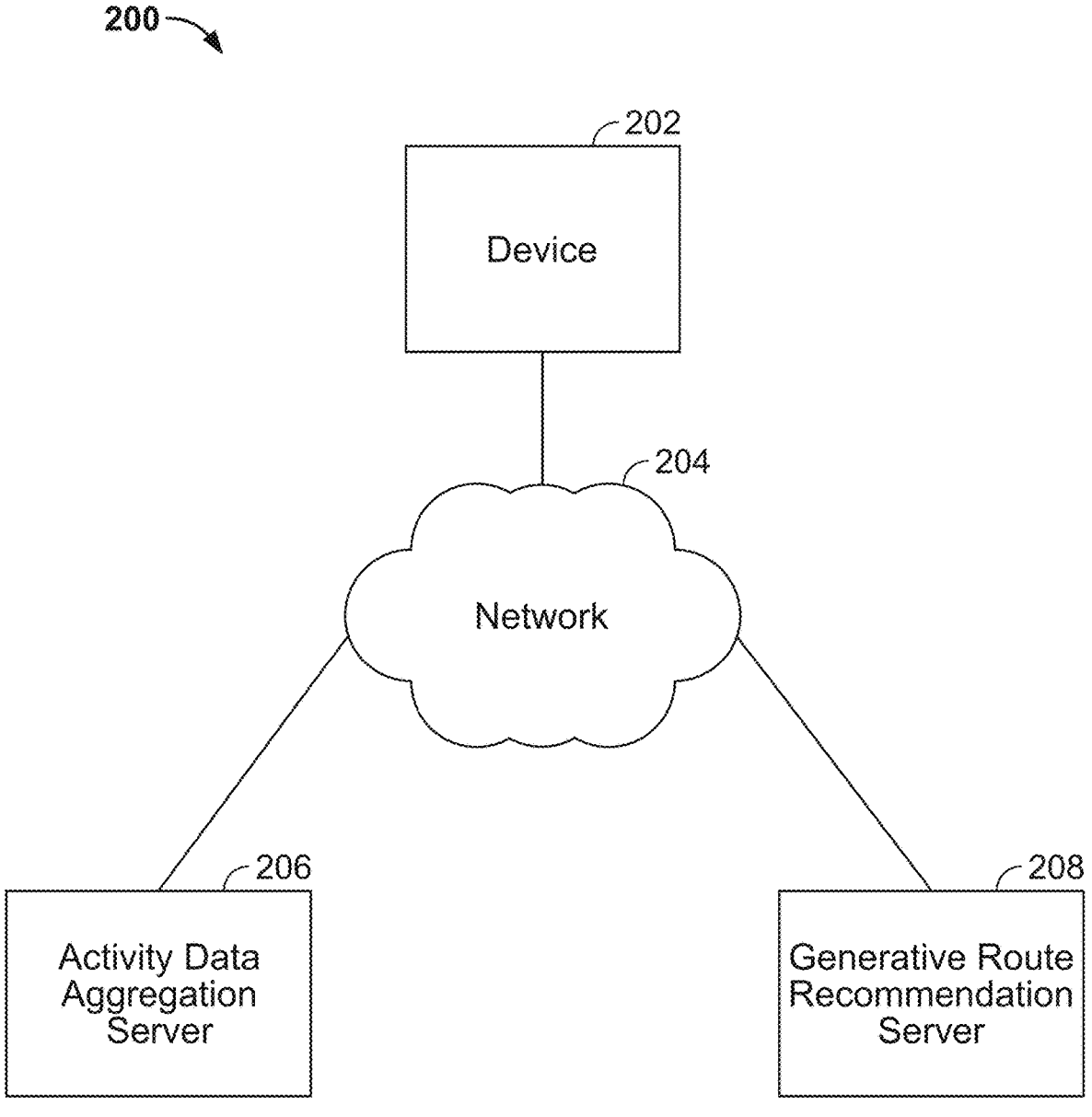
FIG. 2 is a diagram showing an embodiment of a system for using a generative model for route recommendation.

FIG. 2 is a diagram showing an embodiment of a system for using a generative model for route recommendation. System 200 includes device 202, network 204, activity data aggregation server 206, and generative route recommendation server 208. Network 204 may include high-speed data networks and/or telecommunication networks.

Device 202 is a device that can record Global Positioning System (GPS) data and/or other data associated with an activity. Device 202 can also be a device to which GPS data and/or other data associated with a physical activity can be uploaded or transferred. Examples of device 202 include, but are not limited to: a GPS device (e.g., Garmin Forerunner® and Edge® devices, including Garmin Forerunner® 220, 205, 302, 305, 320XT, 405, 405CX, and Garmin Edge® 305, 605, 705, 500, 800, 820, and 2000), a mobile phone, such as a smart phone (e.g., an Android®-based device or Apple iPhone® device) including a GPS recording application (e.g., MotionX®, Endomondo®, Strava®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 202 (or an activity tracking application executing thereon) is configured to record GPS data and auxiliary data associated with an athletic activity during the activity. For example, auxiliary data associated with an activity may include physiological, environmental, and/or performance data. In some embodiments, device 202 is configured to receive recorded GPS data and auxiliary data associated with an activity subsequent to the completion of the activity (e.g., such information is uploaded to device 202). In various embodiments, a recorded activity is a series (a stream) of measurements recorded at corresponding instances/points in time during a user's activity. For example, at each point/instance of time, one or more of the following measurements are recorded and/or computed from recorded data: current geographic (e.g., GPS)/location information, current time, cumulative distance, current elevation, current altitude, current power, current pace, current elevation gradient, current heart rate, and acceleration (e.g., as measured by an accelerometer).

In some embodiments, an "activity" refers to an instance of an athletic performance. Example types of an activity include cycling, running, and skiing. In some embodiments, the recorded GPS data associated with an activity includes a series/stream of consecutive and discrete GPS data points (e.g., latitudinal/longitudinal (lat/lng) coordinates sometimes referred to as "Lat-Lng Data") with a timestamp for each GPS data point. In some embodiments, auxiliary data includes, but is not limited to, barometric data (e.g., elevation/gradient data), heart rate, power/watts (e.g., energy expended), time, speed (e.g., mean and/or maximum speed per segment and/or route, in which mean speed, for example, can be derived from time and GPS information), and/or cadence. Auxiliary data can be recorded at various granularities. For example, auxiliary data can correspond to each GPS data point, the entire activity (e.g., the auxiliary data includes means of the metrics), and/or portions of the activity. As an example, one can use device 202 on a bike ride. At the end of the bike ride, the athlete can review his performance with the recorded GPS data (e.g., through a user interface of device 202) to observe the geographical track (e.g., the set/stream of GPS points) that he traversed, how much energy he expended along the ride, how fast he finished it in, mean speed, elevation-based metrics, and/or other metrics. In some embodiments, device 202 is configured to store the recorded GPS data and the auxiliary data and/or send the recorded data associated with an athletic activity to activity data aggregation server 206. In some embodiments, device 202 is configured to send the recorded data associated with an activity to activity data aggregation server 206 during the activity (e.g., in real-time) and/or after the activity has been completed. In some embodiments, device 202 is configured to present an interactive user interface (e.g., through an activity tracking application executing at device 202). The user interface may display GPS data and receive selections (e.g., made by a user) with respect to the displays. In some embodiments, device 202 sends the selections that it receives to activity data aggregation server 206.

In some embodiments, a user interface may be presented at device 202. In some embodiments, the user interface may be presented by generative route recommendation server 208 through an associated activity tracking application executing at device 202 or by another component that is not shown in the example of FIG. 2. In some embodiments, the user interface is configured to show a visual presentation of routes that are generated/recommended by generative route recommendation server 208.

Activity data aggregation server 206 is configured to aggregate recorded athletic activity data from devices such as device 202. In some embodiments, the activity data received at activity data aggregation server 206 is received during the activities (e.g., in real-time) and/or subsequent to the completion of the activities. Activity data aggregation server 206 is configured to store information associated with each activity. For example, information associated with each activity includes an identifier associated with the athlete that performed the activity, the activity type associated with the activity, the date and/or period of time during which the activity took place, the device type that was used to record the activity data, and the equipment used by the athlete during the activity. In some embodiments, the information associated with each activity may include attributes associated with the activity that were input by an athlete and/or attributes associated with the activity that were inferred from the recorded data. In some embodiments, the information associated with each activity is stored by activity data aggregation server 206 in an activity table that comprises an SQL database. Activity data aggregation server 206 is configured to store the set of GPS data (e.g., a set of GPS/Lat-Lng data points) and corresponding auxiliary data (e.g., barometric/elevation data, timestamps, watts, heart rates, power, etc.) associated with (e.g., each recorded GPS data point along) each activity. In some embodiments, the set of GPS data and a corresponding set of auxiliary data associated with each activity are stored by activity data aggregation server 206 in a virtual hard drive (e.g., Amazon Simple Storage Service) associated with dynamically expanding storage availability. Activity data aggregation server 206 is configured to process the data received for each activity and perform spatial indexing for each activity based on the set of GPS data associated with the activity. In some embodiments, in performing spatial indexing, the information from the activity table and the GPS and corresponding auxiliary data from the virtual hard drive are put together and recorded for each recorded GPS data point and put into a PostGIS database or other spatially enabled and indexed data structure. Activity data aggregation server 206 is configured to send the aggregated activity data to generative route recommendation server 208.

Generative route recommendation server 208 is configured to train a diffusion machine learning model to generate/predict routes according to a requested set of route parameters and a portion of a reference map. In various embodiments, the generative machine learning model that is trained and deployed at inference is a diffusion model in a transformer architecture. This model is also sometimes referred to as a "diffusion transformer model." A diffusion model is based on the principle of de-noising, which is to act as a "restoration operator" that can remove different levels of synthetic noise added to input data. By calling the restoration operator many times starting from pure noise, the diffusion model is generative and can produce a generated clean instance. In some embodiments, an objective of the diffusion transformer model is to predict/produce routes that resemble actual activities that users have historically taken or are able to perform in the future.

In various embodiments, generative route recommendation server 208 is configured to select a subset of historically recorded user activities obtained from activity data aggregation server 206 to use as training/reference activity data for the purpose of training the diffusion transfer model for route recommendation. In some embodiments, generative route recommendation server 208 is configured to select historical user activities that meet a set of criteria for serving as training data. Examples of criteria for serving as training data include activities of a given range of distances (e.g., three to six kilometers), activities of one or more specified types (e.g., run, walk, hike), activities that cross distinct areas in the world, and/or activities that start and end at the same location (e.g., within a given tolerance).

In various embodiments, during training of the diffusion transformer model, for each reference user activity in the training data, generative route recommendation server 208 is configured to generate a cropped image of a reference map corresponding to that reference user activity. As will be described in further detail below, the cropped image of a reference map corresponding to a user activity provides context of the activity to a diffusion transformer model. Examples of a reference map include a global heat map (e.g., which denotes the historical activity popularity of each edge with the map) or a base map (e.g., which denotes edges for which members of the public are permitted to traverse). As will be described in further detail below, the cropped image of a reference map corresponding to a particular reference user activity comprises a portion of the reference map that includes the entire reference user activity (e.g., no portion of the activity is cut out of the cropped image). In some embodiments, the crop of a reference map that is generated for a reference user activity selected to use as training data comprises a cropped image (e.g., a rasterized image) of the reference (e.g., a reference map that corresponds to the activity type of the reference user activity) that is centered on the location of the user activity and whose length and width is the distance of the user activity. Put another way, one example of the crop of a reference map that is generated for a selected recorded user activity to use as training data comprises a square-shaped map image crop that is centered on the start location of the activity and encompasses the entire activity (e.g., no portion of the activity is cut out of the map crop). For example, if the reference map included edges within an entire county, then a cropped image could be a square-shaped, cropped portion of the reference map that includes only the edges that have been traversed by the reference user activity (e.g., a cycling activity). The cropped image of the reference map is also converted from its original latitudinal/longitudinal (lat/Ing) coordinate system to a normalized two-dimensional (2D) coordinate system. For example, the X axis of the cropped image of the reference map spans −1 to 1 and the Y axis of the cropped image of the reference map spans −1 to 1. As such, each location/pixel of the reference map crop can be represented as a coordinate on the normalized 2D coordinate system. Furthermore, for the same reference user activity in the training data, generative route recommendation server 208 is configured to convert the recorded series of GPS data points of the reference user activity into a compact route representation. In some embodiments, the compact route representation comprises a predetermined number of ordered (e.g., sequenced) route points within the normalized 2D coordinate system within the reference user activity's corresponding cropped image of the reference map. For example, typically, the recorded series of GPS data points (or the "geographical track") associated with a recorded user activity includes many more than 64 (e.g., GPS) points, but the geographic shape of the track is reduced to just the 64 number of points that (e.g., sparsely) represent the same shape of the original activity, and also each of the 64 points is converted to be a 2D (X, Y) coordinate in the normalized 2D coordinate system within the corresponding reference map crop. During a forward pass of training the diffusion transformer model, generative route recommendation server 208 is configured to add/inject a known noise vector (e.g., this noise vector shares the same dimensions as the reference set of ordered route points corresponding to the reference user activity) into the reference set of ordered route points. Generative route recommendation server 208 is configured to derive a first set of tokens from at least the reference user activity's cropped image of the reference map and a second set of tokens from the noised reference set of ordered route points corresponding to the reference user activity. Then, generative route recommendation server 208 is configured to feed the sets of tokens into the diffusion transformer model. In response to the input sets of tokens, the diffusion transformer model will output a predicted noise vector (the prediction of noise that had been added to the reference set of ordered route points). Generative route recommendation server 208 is configured to determine a difference between the known noise vector and the predicted noise vector associated with the reference user activity to determine a penalty. After determining the penalties corresponding to various reference user activities during training such as described above, generative route recommendation server 208 is configured to update the parameters of the diffusion transformer model to improve the accuracy with which the model is to subsequently predict the noise vectors that have been injected into a noised set of ordered route points based on a corresponding cropped image of a reference map. Through training, the diffusion transformer model learns to predict the noise that had been added to an input set of ordered route points such that the removal of the predicted noise from the set of ordered route points would cause the resulting (de-noised) set of ordered route points to better align with the edges that are denoted within given cropped images of reference maps and therefore, resemble real routes on which users can perform activities.

After generative route recommendation server 208 has trained the diffusion machine learning model as described above, generative route recommendation server 208 is configured to receive a request to generate one or more route recommendations based on a set of desired route parameters. For example, the request to generate route recommendations may be initiated by a user interaction with an application (e.g., navigating to a designated portion of the application) or programmatically generated based on an event (e.g., the elapse of a time interval). The route recommendation request may include one or more parameters such as, for example, a desired start location, a desired activity type (e.g., one of running, cycling, swimming, hiking, walking), a distance, and/or one or more desired preferences (e.g., a desired elevation) associated with the route. In response to receiving a route recommendation request, generative route recommendation server 208 is configured to generate a corresponding cropped image of a reference map based on at least some of the parameters of the request. In one example, a reference map cropped image is generated for the request based on at least the desired start location that is included in the request. In some embodiments, a cropped reference map image is generated for the request at inference time in a manner similar to how a cropped reference map image is generated for a selected recorded user activity data at training time. For example, at inference, the cropped image of the reference map (e.g., a heat map that matches the desired activity type of the request) is generated for the request by centering the reference map on the desired start location and by generating a crop of the centered heat map of dimensions that are based on the desired distance of the request. For example, if the desired distance were one mile, then the crop of the reference map would be one mile by one mile centered on the desired start location. Similar to the reference map crop generated at training, the reference map crop generated at inference time is also converted to the normalized 2D coordinate system (e.g., where X axis spans [−1, 1] and the Y axis spans [−1, 1]).

In response to each route recommendation request, generative route recommendation server 208 is configured to perform inference with the previously trained diffusion transformer model over multiple steps based on the request's corresponding cropped image of the reference map and add a successfully smaller amount of noise level ("time") to an input set of ordered route points at each subsequent step. After the diffusion transformer model runs the last step, the resulting set of ordered route points corresponds to a representation of a recommended route. As will be described in further detail below, at the initial step of inference in response to a particular route recommendation step, a set of a predetermined number (e.g., 64) of pure noise (random) route points on the normalized coordinate system of the cropped image of the reference map is generated. Then, a first set of tokens is derived from the request's corresponding cropped image of the reference map and a second set of tokens is derived from the set of a predetermined number (e.g., 64) of ordered pure noise (random) route points. At least both sets of tokens are then fed into the diffusion transformer model. At this initial step, the diffusion transformer model is configured to evaluate the input tokens related to the cropped reference map image and the tokens related to the set of ordered pure noise route points in relation to each other to predict/output a predicted noise vector such that the removal of the predicted noise from the set of ordered route points would cause the resulting (de-noised) set of ordered pure noise route points to better align with the edges that are denoted within the request's cropped image of the reference map. At the next, second step of inference for the request, the predicted noise vector output at the end of the previous, initial step is removed from the set of pure noise ordered route points and that resulting set of ordered route points (the new, input noised set of ordered route points) is injected with a smaller amount of noise level than was used during the previous, initial step. Given that the previous, initial step was pure noise or put another way, at the initial step, the noise level was set to 1 (on a scale of [0, 1] and where a noise level of 1 is all noise), then in this next, second step, the noise level that is slightly less than 1 (e.g., noise level=0.99) is injected into the set of ordered route points resulting from the previous, initial step. For this second step, a new set of tokens is derived from the current noised set of ordered route points. In this second step, the previously determined set of tokens derived from the request's corresponding cropped image of the reference map and this new token set of tokens derived from the current noised set of ordered route points are fed into the diffusion transformer model. At this second step, the diffusion transformer model is configured to evaluate the input tokens related to the cropped reference map image and the tokens related to the current noised set of ordered route points in relation to each other to predict/output a predicted noise vector such that the removal of the predicted noise from the current noised set of ordered route points would cause the resulting (de-noised) set of ordered route points to better align with the edges that are denoted within the request's cropped image of the reference map. As described previously, at the next, third step of inference for the request, the predicted noise vector is removed from the current noised set of ordered route points and yet another smaller noise level is added to the denoised noised set of ordered route points to create a new, current noised set of ordered route points. For this third step, a new set of tokens is derived from the current noised set of ordered route points. In this third step, the previously determined set of tokens is derived from the request's corresponding cropped image of the reference map of the new set of tokens derived from the current noised set of ordered route points are fed into the diffusion transformer model, and so forth. Subsequent steps of inference using the diffusion transformer model are performed for the request until a set of stop criteria is met (e.g., a desired number of steps have been performed) and the resulting denoised set of ordered route points after that last step is determined as the representation of a recommended route. For example, if each set of ordered route points that is used to represent a route is 64 ordered route points, then the representation of a recommended route is also 64 ordered route points.

In some embodiments, for a given route recommendation request, generative route recommendation server 208 is configured to trigger the generation of a batch of one or more recommended routes using respective instances of inference as described above, to obtain a corresponding batch of one or more representations of recommended routes.

In some embodiments, generative route recommendation server 208 is configured to convert the representation of each recommended route that has been generated by the diffusion transformer model into a visual presentation of a route that is overlaid on a map and cause that visual route presentation to be presented at a user interface at a corresponding device (e.g., device 202). As mentioned above, the compact representation of a recommended route comprises a predetermined number (e.g., 64) of ordered route points on the normalized 2D coordinate system that sparsely defines the shape of a route. As such, for each such recommended route representation, generative route recommendation server 208 is configured to translate the predetermined number (e.g., 64) of ordered route points on the normalized 2D coordinate system of the representation into corresponding GPS data points and then expand the number of GPS data points into a GPS track to resemble a realistic route and one that also meets other request parameters. Then, generative route recommendation server 208 is configured to overlay the GPS track of the recommended route on the presented edges within a presentation of a map to be output at a corresponding device (e.g., device 202).

As described above, system 200 leverages historically recorded user activities as training data to teach a diffusion transformer model to accurately predict the shape of realistic user activities using relevant portions of the reference maps that are provided as context. As a result, the trained diffusion transformer model can be used, at inference, to efficiently generate realistic routes that are compatible with the constraints that are the requested route recommendation parameters for any area in the world based on portions of reference maps that are dynamically generated as context for the requests. What is more, the resulting recommended routes are varied across the different topologies of each given map region.

Figure 3:
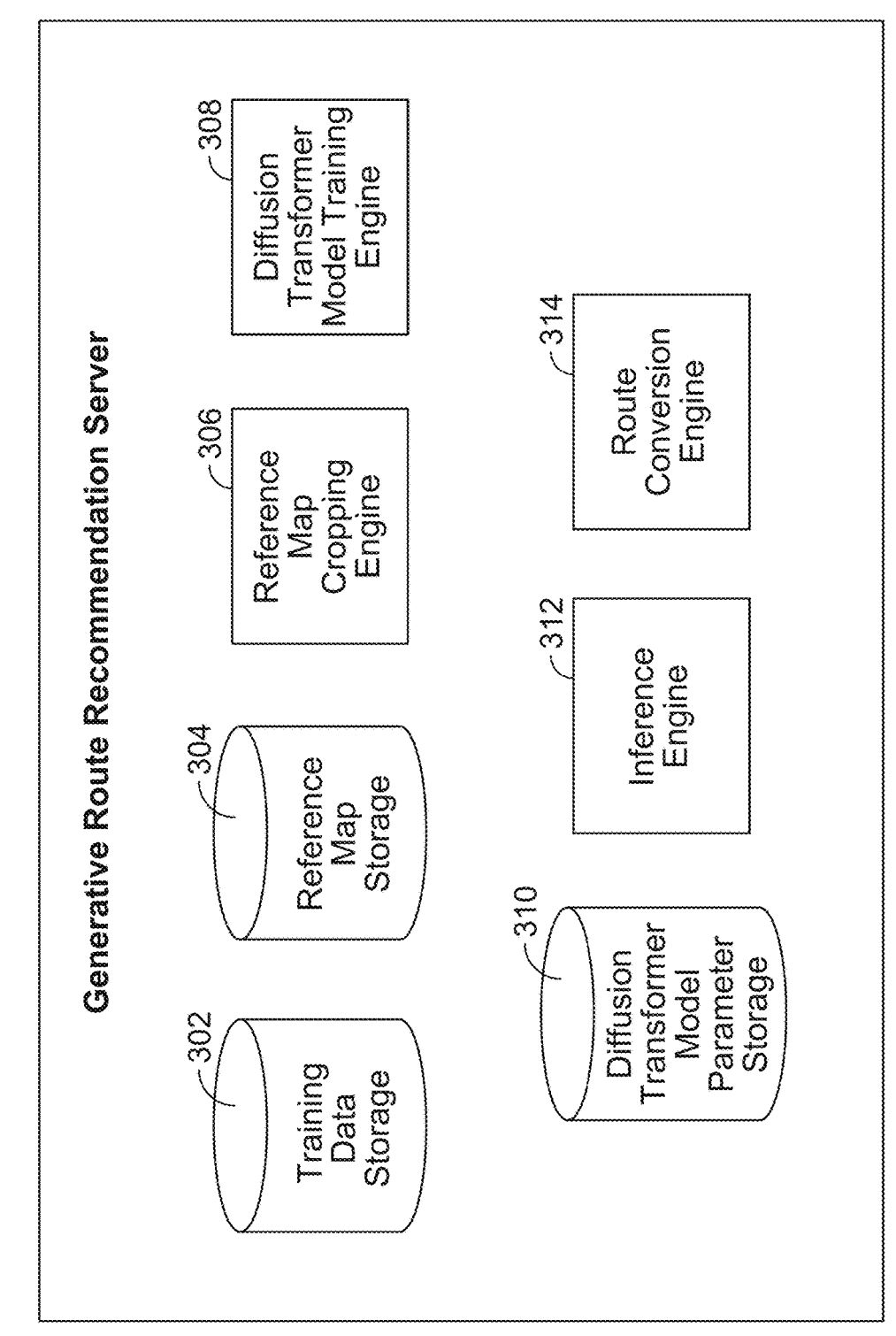
FIG. 3 is a diagram showing an example of a generative route recommendation server in accordance with some embodiments.

FIG. 3 is a diagram showing an example of a generative route recommendation server in accordance with some embodiments. In some embodiments, the example generative route recommendation server of FIG. 3 can be used to implement generative route recommendation server 208 of FIG. 2. As shown in FIG. 3, the example generative route recommendation server includes training data storage 302, reference map storage 304, reference map cropping engine 306, diffusion transformer model training engine 308, diffusion transformer model parameter storage 310, inference engine 312, and route conversion engine 314. In some embodiments, each of training data storage 302, reference map storage 304, reference map cropping engine 306, diffusion transformer model training engine 308, diffusion transformer model parameter storage 310, inference engine 312, and route conversion engine 314 can be implemented, for example, as distinct or integrated software components, which can include module(s), package(s), and/or other distinct or integrated sub-components to provide an executable computer program that can perform these described functions when executed on a processor, and can be implemented using a programming language such as Scala, Go, Java, Python, Objective C, and/or other programming languages. An example hardware computing environment to execute the components of FIG. 3 includes a cloud computing service, such as Amazon's Web Services®.

Training data storage 302 is configured to store training data for training the diffusion transformer model for which the parameters thereof are stored at diffusion transformer model parameter storage 310. In some embodiments, training data storage 302 includes historical activity data that has been aggregated by an activity data aggregation server (e.g., activity data aggregation server 206 of FIG. 2). In some embodiments, training data storage 302 includes recorded user activities that have been aggregated by an activity data aggregation server (e.g., activity data aggregation server 206 of FIG. 2). As mentioned above, each recorded user activity may include a series of GPS data and also auxiliary data associated with various points during the activity and/or the activity as a whole. In various embodiments, a recorded user activity is a series (a stream) of measurements recorded at corresponding instances/points in time during a user's activity. For example, the user activity's auxiliary data may include at each point/instance of time, one or more of the following measurements recorded and/or computed from recorded data: current geographic (e.g., GPS)/location information, current time, cumulative distance, current elevation, current altitude, current power, current pace, current elevation gradient, current heart rate, and acceleration (e.g., as measured by an accelerometer). Also, for example, the user activity's auxiliary data may include the activity type (e.g., running, hiking, cycling, skiing) and the type of equipment that was used during the activity.

Reference map storage 304 is configured to store one or more reference maps. In some embodiments, each reference map may include the edges (e.g., paths, roads, streets, trails) of a corresponding region of the world. In some embodiments, reference map storage 304 stores different reference maps that correspond to different activity types. For example, a first reference map that corresponds to the activity type of running may include edges that are deemed permissible and/or indicate the relative popularity of each edge for running and a second reference map that corresponds to the activity type of cycling may include edges that are deemed permissible and/or indicate the relative popularity of each edge for cycling. In some embodiments, reference map storage 304 stores reference maps that are global heat maps. For example, a global heat map was generated by aggregating the number of user activities (e.g., that matched the activity type of the heat map) (e.g., and that were aggregated by activity data aggregation server 206 of FIG. 2) that had historically traversed each edge within the heat map. As such, a reference map that comprises a global heat map includes data that denotes the relative historical usage/popularity of each edge within the global heat map. In some embodiments, reference map storage 304 stores reference maps that are base maps. For example, a base map was generated by a third-party/governmental entity to show actual path geometry of real known roads that are allowed to be traversed by members of the public. In some embodiments, each reference map that is stored at reference map storage 304 represents locations within the latitudinal/longitudinal (lat/lng) coordinate system.

Reference map cropping engine 306 is configured to generate cropped images from reference maps. In various embodiments, a cropped image of a reference map comprises a cropped portion of a reference map that is relevant to the purpose of the cropped image. As will be described in further detail below, the cropped image of a reference map is used to provide context to the diffusion transformer model at both training and inference in relation to the location of the training data and/or the desired start location of a request for a route recommendation. In some embodiments, the cropped image of a reference map can be generated for each selected user activity using one or more of the following factors/considerations:

Edges Based

In some embodiments, edges are used from the reference map. For example, if edges could be converted to an embedding space, a seq2seq-based model could then be presented with a candidate set of edges and the generative model generates a sequence of choices.

Image Based

In some embodiments, a crop is generated from the reference map image. An image-based approach may be desirable because so much of the deep learning stack is built around images.

Goal Route Distance

In some embodiments, the cropped image of the reference map is generated such that the distance of the activity corresponds to the dimensions of the cropped image. This means the model can learn to always produce a route of the same length in normalized coordinates, which in inference can match a goal/desired distance.

In some embodiments, reference map cropping engine 306 is configured to generate a cropped image of a reference map during the training of a diffusion transformer model that is performed by diffusion transformer model training engine 308. During the training of a diffusion transformer model to act as a route recommendation model, for each reference user activity in the training data, diffusion transformer model training engine 308 is configured to request reference map cropping engine 306 to generate a corresponding cropped image of a reference map. For example, to generate a cropped image of a reference map for a reference user activity in the training data, reference map cropping engine 306 is configured to identify a reference map (e.g., either a heat map or a reference map, depending on the configuration of the diffusion transformer model) that is associated with the activity type of the reference user activity and then generate the smallest square portion of the identified reference map that fully encompasses the GPS data recorded for the reference user activity. Reference map cropping engine 306 would then generate a cropped image based on this square portion of the reference map and return it to diffusion transformer model training engine 308.

In some embodiments, reference map cropping engine 306 is configured to generate a cropped image of a reference map during inference with a diffusion transformer model for each route recommendation request. For each request, inference engine 312 is configured to request reference map cropping engine 306 to generate a corresponding cropped image of a reference map. For example, to generate a cropped image of a reference map for a route recommendation request during inference, reference map cropping engine 306 is configured to identify a reference map (e.g., either a heat map or a reference map, depending on the configuration of the diffusion transformer model) that is associated with a desired activity type indicated in the request, center the identified reference map on the desired start location indicated in the request, and generate a crop of the center of the reference map with dimensions that are determined by the desired distance indicated in the request. Reference map cropping engine 306 would then return this cropped image of the reference map to inference engine 312.

In some embodiments, each cropped image of a reference map that is generated by reference map cropping engine 306 comprises a rasterized image that has been converted to be on a normalized 2D coordinate system (instead of the latitudinal/longitudinal (lat/lng) coordinate system of the original reference map). As such, for example, each cropped image of a reference map will include an X axis that extends from −1 to 1 and a Y axis that extends from −1 to 1 and as such, each pixel's location on the cropped image is defined as an (X, Y) coordinate. If the reference map were a global heat map, then each pixel on the cropped image is also encoded with a normalized value (which can also be represented visually as a shade on a grayscale) that denotes how historically often an edge with which the pixel is a part, was traversed.

Diffusion transformer model training engine 308 is configured to train a diffusion transformer model to act as a route recommendation model using recorded user activities and corresponding cropped images of reference maps as context. The following describes an example neural network that is used for diffusion training to remove noise from routes given reference map context in accordance with some embodiments.

In some embodiments, diffusion transformer model training engine 308 is configured to select a subset of reference user activities stored at training data storage 302 to train the diffusion transformer model. For example, diffusion transformer model training engine 308 is configured to select only a subset of reference user activities that matches a set of training data criteria. The set of training data criteria may include one or more of the following examples:

Contains foot sports (run, walk, hike).

Filtered to a specific narrow distance range (3-6 km).

Only a few per distinct area in the world (to avoid multiple identical routes).

Only one per user/athlete.

Filtered to activities that start and end at the same location (within a given tolerance).

In a specific example, about 400k recorded user activities are selected to use as training data.

In various embodiments, for a selected recorded user activity to use as reference user activity in the training data, a corresponding cropped image of a reference map is first generated. It is desirable to provide the model context for a user's specific location, and to be able to have the model generalize to any location with roads used by users without the model having to learn to memorize specific regions. Thus, the diffusion transformer model is conditioned on map information. As such, in various embodiments, for each selected user activity to include in the training data (and also for a recommended route that is generated at inference time, as will be described in further detail), diffusion transformer model training engine 308 is configured to request reference map cropping engine 306 to generate a corresponding cropped image of a reference map, as described above. Diffusion transformer model training engine 308 is configured to generate a compact route representation of the GPS track that is included in the reference user activity that comprises a set of a predetermined number of ordered route points within the normalized 2D coordinate system of the activity's corresponding cropped image of the reference map. For example, the predetermined set of route points includes 64 ordered points, where each point is associated with a corresponding index value in the [0, 63] range that denotes the order/sequence of routes in the route representation. Diffusion transformer model training engine 308 is configured to then add a known noise level (e.g., associated with the current forward pass of training the model) into the compact route representation (the set of ordered route points). As will be described in further detail below, diffusion transformer model training engine 308 is configured to derive tokens from the noised set of ordered route points and the activity's corresponding cropped image of the reference map and then feed the tokens into the diffusion transformer model. In response, the diffusion transformer model is configured to output a predicted noise level that had been added to the set of ordered route points. Diffusion transformer model training engine 308 is configured to determine the difference ("loss" or "penalty") between the known noise level and the predicted noise level and (after potentially batching together the differences/penalties between multiple pairs of known noise levels and predicted noise levels) update the parameters of the diffusion transformer model at diffusion transformer model parameter storage 310 to minimize the subsequent differences between noise levels predicted by the model and the given/known noise levels that were injected into the reference user activities used in training. Diffusion transformer model training engine 308 is configured to train the diffusion transformer model until a stop criterion is met (e.g., a desired number of forward passes are performed and/or the differences between noise levels predicted by the model and the given/known noise levels that were injected into the reference user activities are determined to have converged).

Inference engine 312 is configured to perform inference with the previously trained diffusion transformer model (e.g., as represented by the parameters stored at diffusion transformer model parameter storage 310) in response to a route recommendation request to generate a recommended route. In some embodiments, the request includes parameters associated with a desired route recommendation such as, for example, a desired start location, a desired activity type, and a desired distance. In various embodiments, for a route recommendation request that is received at inference, a corresponding cropped image of a reference map is first generated. Inference engine 312 may request reference map cropping engine 306 to generate a cropped image of an identified reference map, as described above. As will be described in further detail below, inference engine 312 is configured to perform multiple steps of inference for each route recommendation request. At the first/initial step of inference for a given route recommendation request, inference engine 312 is configured to generate a set of a predetermined number of pure noise ordered route points within the normalized 2D coordinate system of the cropped image of the reference map that was determined for that request. Because in this first step, the set of the predetermined number of ordered route points is pure noise, they are a sequence/series (as denoted by index values) of points at random (X, Y) coordinates. This set of the predetermined number of ordered route points forms an initial compact representation of a route going into the first step of inference. Similar to what happens during training, inference engine 312 is configured to derive tokens from the set of the predetermined number of ordered route points and the route recommendation request's corresponding cropped image of the reference map and then feed the tokens into the diffusion transformer model. In response, the diffusion transformer model is configured to output a predicted noise level that had been added to the set of ordered route points. Inference engine 312 is configured to subtract the predicted noise level from the set of the predetermined number of ordered route points of pure noise to determine a new output set of ordered route points to proceed as input to the next, second step of inference. At the next, second step of inference, inference engine 312 is configured to add less than pure noise to the set of ordered route points output from the first/initial step to generate a new noised set of ordered route points. Again, inference engine 312 is configured to derive tokens from this noised set of ordered route points and feed the tokens along with those previously determined from the cropped image of the reference map to the diffusion transformer model, and so forth. Inference engine 312 is configured to perform successive steps of inference and add successively smaller noise levels to the set of ordered route points input into each successive step until a stop condition is met (e.g., a desired number of steps have been performed). The diffusion transformer model's predicted noise level from the last step is subtracted from that step's noised set of ordered route points to arrive at the compact representation (e.g., a set of 64 ordered route points) of a recommended route.

Route conversion engine 314 is configured to convert a (compact) representation of a recommended route (e.g., that is generated by inference engine 312 in response to a route recommendation request) into an expanded representation of a route. Given that the representation of a recommended route that is output by inference engine 312 is a predetermined number (e.g., 64) of ordered route points on the normalized 2D coordinate system that sparsely represents the shape of a route, route conversion engine 314 is configured to convert the set of ordered route points back into corresponding latitudinal/longitudinal (lat/lng) (GPS) coordinates. In some embodiments, route conversion engine 314 is further configured to expand the number of GPS coordinates to match the shape of edges in the original reference map. In some embodiments, route conversion engine 314 is configured to present the expanded GPS data point representation of the recommended route as a visualization of the recommended route overlaid on a map at a user interface (e.g., to be presented at a device).

FIG. 4 is a flow diagram showing an example of a process for training a diffusion transformer model to act as a route recommendation model in accordance with some embodiments. In some embodiments, process 400 may be implemented, at least in part, by generative route recommendation server 208 of FIG. 2.

Process 400 may be implemented during one forward pass or epoch of training the diffusion transformer model on selected, reference user activities. In some embodiments, more than one instance of process 400 may be used to train the diffusion transformer model. For example, the same set of reference user activities can be used to train the model over one or more epochs and where different known noise vectors are applied for each epoch.

At 402, a corresponding cropped image of a reference map is determined based on a (next) reference user activity, wherein the cropped image of the reference map is associated with a normalized 2D coordinate system. In some embodiments, a cropped image of an identified reference map is generated for the (next) reference user activity. An example process of generating the cropped image of an identified reference map is described in FIG. 5, as described further below. Whereas the reference map uses latitudinal/longitudinal (lat/lng) (GPS) coordinates, the cropped image is generated to use a normalized 2D coordinate system. For example, the X axis of the cropped image of the reference map spans −1 to 1 and the Y axis of the cropped image of the reference map spans −1 to 1. As such, each location/pixel of the reference map crop can be represented as a (X, Y) coordinate on the normalized 2D coordinate system.

As shown in process 400, a respective cropped image of a reference map is generated for each reference user activity based on the attributes of that activity.

At 404, the cropped image of the reference map is divided into a set of global patches. The cropped image of the reference map is divided into a set of non-overlapping portions called "patches."

At 406, a GPS track of the reference user activity is converted into a reference set of ordered route points within the normalized 2D coordinate system. The series of GPS data points of the reference user activity is converted into a compact route representation that comprises a reduced number (e.g., 64) of ordered route points (the "reference set of ordered route points") on the normalized 2D coordinate system of the cropped image of the reference map. The reduced number of route points to which to convert the series of GPS data points of the reference user activity includes typically far fewer route points than the recorded number of GPS data points of the reference user activity. For example, the geometry of the reference user activity's GPS track is standardized into 64 uniformly and optimally spaced GPS data points, and then these 64 GPS coordinates are mapped into the normalized 2D coordinate system consistent with the cropped image. This reference set of ordered route points is "ordered" or associated with a sequence that is denoted by a corresponding index/position value associated with each route point. For example, if the reference set of ordered route points included 64 route points, then their order/sequence is determined by their respective index/position values from the range of [0, 63].

Alternatively, a model that generates/ingests routes expressed as images with 64 hot pixels or a drawn line on the image may be used.

At 408, a known noise vector is added to the reference set of ordered route points. A known noise vector comprising (e.g., 64) 2D (X and Y) points of noise in the normalized 2D coordinate system (e.g., that has been sampled or generated for the current training epoch) is added/injected to the activity representation vector (e.g., 64 ordered points) (the reference set of ordered route points) simplified from the geographical track of the reference user activity. In some embodiments, the noise in each of X and Y dimensions of the normalized 2D coordinate system for each route point in the reference set is independently determined (e.g., sampled from a uniform distribution of noise from 0 to 1). Put another way, for example, if the reference set of ordered route points comprises a vector of 64 (X, Y) coordinates, then the known noise vector comprises a vector of 64 coordinates and where each coordinate comprises a noise in the X direction and a separate noise in the Y direction.

At 410, sets of tokens are derived from at least the set of global patches and the noised reference set of ordered route points. Features are extracted from the noised activity representation vector (the noised reference set of ordered route points) and the global patches determined from the cropped image of the reference map to generate a set of tokens to input into the model. The tokens that include the features extracted from the noised activity representation vector and the global patches are formatted in dimension(s) that are compatible with the diffusion transformer model. In some embodiments, each token comprises a vector of values. An example process of deriving tokens that include the features extracted from the noised activity representation vector and the global patches is described in FIG. 6, as described further below.

At 412, the sets of tokens are input into a diffusion transformer model. The idea of providing tokens related to the reference user activity and to the related cropped image of the reference map is that the cropped map image will provide context to the generative model that is roughly a probability distribution of the full set of activities, specific to that location. The set of tokens associated with the activity are then fed into the diffusion transformer model to have the model predict the noise vector that had been injected into the original activity representation vector.

At 414, a predicted noise vector corresponding to the noised reference set of ordered route points is obtained from the diffusion transformer model. For example, if the reference set of ordered route points comprises a vector of 64 (X, Y) coordinates, then the predicted noise vector comprises a vector of 64 (X, Y) coordinates and where each coordinate comprises a separate predicted noise in the X direction and a separate predicted noise in the Y direction.

At 416, a respective penalty is determined based on a difference between the known noise vector and the predicted noise vector. The difference between the model's predicted noise vector and the known/actual noise vector added to the original activity representation vector is used to determine the corresponding loss function for this specific reference user training activity. In one example, the mean squared error between a model's predicted noise vector and the known/actual noise vector added to the original activity representation vector is the loss function that will be used to (eventually) adjust the parameters of the model during this training phase.

At 418, whether there is at least one more reference user activity in a current batch of training data is determined. In the event that there is at least one more reference user activity in the current batch of training data, control is returned to 402 with the next reference user activity in the batch. Otherwise, in the event that there are no more reference user activities in the current batch of training data, control is transferred to 420.

At 420, parameters of the diffusion transformer model are updated based at least in part on the respective penalties. After respective penalties have been determined for a batch of reference user activities as described above, the respective penalties are used to collectively adjust the parameters of the diffusion transformer model to minimize future penalties that will be created by the model from future predictions. Put another way, the parameters of the diffusion transformer model are updated based at least in part on the respective penalties in a process of backpropagation.

In practice, the diffusion transformer model may be trained similar to the manner described above across batches of selected recorded user activities and their respectively generated cropped reference map images across one or more training epochs (e.g., and where different batches/epochs are associated with different known amounts of noise injection) until the resulting loss function meets a set of stop criteria.

Intuitively, over the course of training the model while using cropped map images as context, the model learns to predict the amount of noise that had been injected into the noised activity representation vector by predicting that points associated with activities will likely be in areas of the provided cropped map images with higher normalized values (e.g., which indicate higher heat/higher historical activity traversal/higher probability of the presence of an edge). Furthermore, over the course of training, given the contexts of the provided cropped map images, the model will learn to predict noise/determine the locations of the points of the activity representation in a way that can stitch together a full activity that follows the edges of the provided maps that exclude paths that are not possible (e.g., gaps or lack of edges within the maps). Put another way, the maps provided to the model constrain the predicted noise and therefore, the shape of activities that can be generated/predicted by the model.

FIG. 5 is a flow diagram showing an example of a process for generating a cropped image of a reference map corresponding to a reference user activity during training of a diffusion transformer model in accordance with some embodiments. In some embodiments, process 500 may be implemented, at least in part, by generative route recommendation server 208 of FIG. 2. In some embodiments, step 402 of process 400 of FIG. 4 may be implemented using process 500.

At 502, an indication to generate a crop of a reference map corresponding to a reference user activity is received, wherein the indication includes at least GPS data associated with the reference user activity and an activity type associated with the reference user activity. The indication includes at least the series of recorded GPS data points and the activity type associated with the reference user activity.

At 504, a reference map is determined based on the activity type. In some embodiments, a stored reference map that is associated with the same activity type as that of the reference user activity is selected. For example, if the reference map is a global heat map and the activity type of the reference user activity is running, then the global heat map that was generated by aggregating historical running activities is selected. Also, if the reference map were a global heat map, then a visualization of the reference map would show the edges that have been determined to be more popular in a thicker/brighter presentation and the edges that have been determined to be less popular in a thinner/darker presentation.

At 506, dimensions of a cropped map image are determined based on a distance determined from the GPS data. In some embodiments, each dimension (e.g., the length and width) of the cropped map image is determined as a function of the distance of the reference user activity. In some embodiments, the distance of the reference user activity is determined as the length between the two farthest points of the reference user activity. In one example, the length and width of the cropped map image are each equal to (e.g., or longer than) the distance of the reference user activity, meaning that the cropped map image would be a square.

At 508, a center of the cropped map image is determined based on a start location associated with the GPS data. A square of the determined dimensions of the cropped map image is placed over the reference map and in a manner that is centered on the start location of the reference user activity.

At 510, the cropped map image is generated from the reference map based on the determined dimensions and the determined center. For example, if the distance of the reference user activity were two miles and the start location were at coordinate (Lat_1, Lng_1), then the cropped map image corresponding to this reference map would comprise a two mile by two mile (e.g., rasterized) square crop of the reference map that is centered on coordinate (Lat_1, Lng_1). By ensuring that each of the length and width of the cropped map image is at least the distance of the reference user activity and also centered on the start location of the reference user activity, the cropped map image will be guaranteed to include the entirety of the series of GPS data points associated with the reference user activity.

FIG. 6 is a flow diagram showing an example of a process for deriving tokens from a set of ordered route points and a corresponding cropped image of a reference map in accordance with some embodiments. In some embodiments, process 600 may be implemented, at least in part, by generative route recommendation server 208 of FIG. 2. In some embodiments, step 410 of process 400 of FIG. 4 may be implemented using process 600.

Process 600 describes an example process of deriving tokens from features extracted from a set of ordered route points and a corresponding cropped image of a reference map and where the tokens are in dimensions/formatted that are compatible to be input into a diffusion transformer model. In some embodiments, process 600 can be implemented during the training of the diffusion transformer model to serve as a route recommendation model, such as described in process 400 of FIG. 4. In some embodiments, process 600 can also be implemented during the inference time of using the diffusion transformer model to output a route recommendation, as will be described in further detail below.

At 602, a cropped image of a reference map and a noised set of ordered route points within the cropped image of the reference map are received. In the context of training a diffusion transformer model (e.g., using a process such as process 400 of FIG. 4), the cropped image of the reference map was generated based on a reference user activity (e.g., using a process such as process 500 of FIG. 5) that was selected to be in the training data and the noised set of (e.g., 64) ordered route points within the cropped map image comprises a simplified representation of the GPS track of the reference user activity. In the context of performing inference with a diffusion transformer model in response to a route recommendation request, the cropped image of the reference map was generated based on the parameters included in the route recommendation request and the noised set of (e.g., 64) ordered route points within the cropped map image comprises either a set of pure noise ordered route points or a set of ordered route points input into a new step of inference and to which a noise level of that step has been added.

In either the training or the inference contexts, each route point comprises a corresponding (X, Y) (where each of X and Y is in the [−1, 1] range) pixel coordinate on the normalized 2D coordinate system of the cropped map image (e.g., a rasterized image) and also a corresponding index value that denotes that point's relative position in the sequence of route points in the set. If there are 64 ordered route points, then the index value of each route point would be a unique whole number in the range of [0, 63].

At 604, a first set of tokens is derived from the noised set of ordered route points, wherein each token from the first set of tokens is derived from a respective 2D pixel coordinate and a respective index value corresponding to a respective ordered route point. The diffusion transformer model does not have a notion of the order of the route points and not only does the 2D information of the (X, Y) coordinate of a route point need to be considered in generating a corresponding token but so does the index value of that route point. In some embodiments, a sine function is applied to a route point's index value and the vector value of the route point's (X, Y) coordinate to determine a corresponding token that comprises a vector of 1,000, where each of the 1,000 values in the vector comprises an output value having some different sine function applied to one of those three pieces of information related to the route point. Put another way, the lower dimension of each route point is scaled up to the higher dimension of a corresponding token. In some embodiments, the 1,000 dimensional token vector that is generated for each route point is also called a "point embedding."

At 606, a set of global patches divided from the cropped image of the reference map is received. As mentioned above, the cropped map image is divided into non-overlapping global patches. For example, each global patch has a fixed size, which is 64 by 64 pixels.

At 608, a second set of tokens is derived from the set of global patches, wherein each token from the second set of tokens is derived from pixel values corresponding to a respective global patch. If the token that is accepted by the diffusion transformer model takes a token that comprises a vector of dimension 1,000, then every pixel of a global patch is mapped directly or indirectly (e.g., after a convolutional step) to a value in the token vector. Put another way, the higher dimension of each global pixel patch is mapped to the lower dimension of a corresponding token. Another way to think of it is to compress the pixel values of a global patch in a way that fits into the dimensions of a token vector.

Figure 7:
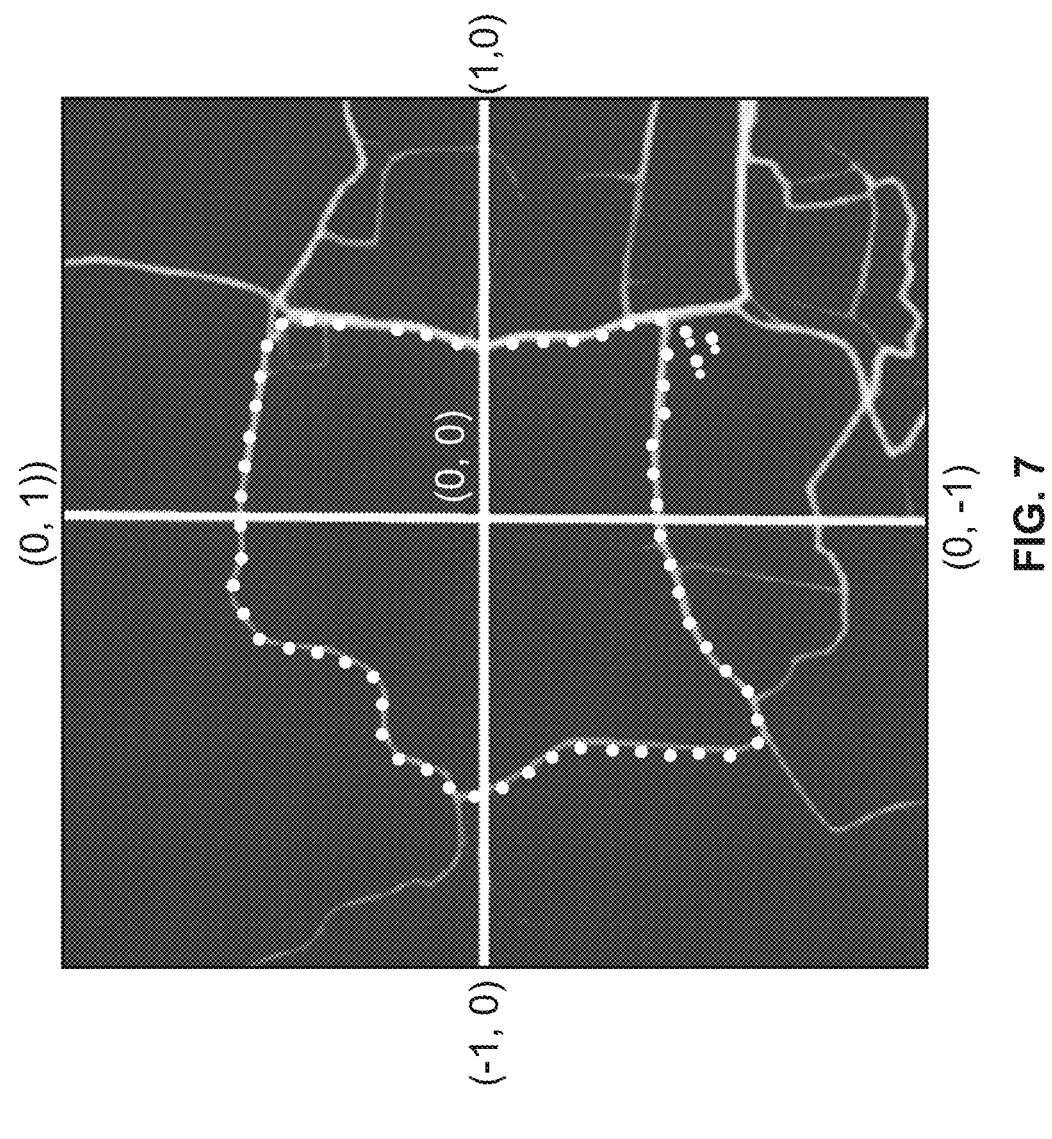
FIG. 7 is a diagram that shows an example cropped image of a reference map that has been generated for a reference user activity selected for training data in accordance with some embodiments.

FIG. 7 is a diagram that shows an example cropped image of a reference map that has been generated for a reference user activity selected for training data in accordance with some embodiments. For example, cropped map image 700 was generated using a process such as process 500 of FIG. 5. Additionally, cropped map image 700 shown in FIG. 7 is overlaid with the compact representation of a corresponding recorded user activity and where the compact representation comprises 64 sparse points on the normalized X-Y coordinate system of cropped map image 700. As shown in FIG. 7, in this normalized 2D coordinate system, each of the X and Y axes spans the range of −1 to 1.

In the example of FIG. 7, cropped map image 700 is cropped from a heat map type of reference map, meaning that each pixel includes a color on the grayscale corresponding to the relative/normalized degree to which historical recorded user activities (e.g., of an activity type associated with the map) had passed through that pixel. Put another way, the brightness of each edge in the image represents the relative/normalized degree to which historical recorded user activities had passed through that pixel and where a brighter (whiter) pixel represents a higher/normalized degree of historical activity traversal.

FIG. 8 is a flow diagram showing an embodiment of a process for using a diffusion machine learning model for route recommendation. In some embodiments, process 800 may be implemented, at least in part, by generative route recommendation server 208 of FIG. 2.

At 802, a request to generate a route recommendation for an activity is received. In various embodiments, the diffusion transformer model that was previously trained (e.g., using a process such as process 400 of FIG. 4) is called upon to generate one or more recommended routes at inference. In a first example, a request for route recommendation is initiated by a particular user who makes a selection at a website or application associated with athletic activity tracking for new routes to potentially attempt. In a second example, a request for route recommendation is programmatically generated on behalf of a particular user when the user navigates to a particular page/portion in a website or an application.

In various embodiments, a request to generate a recommended route includes one or more parameters such as, for example, at least a desired start location, a desired activity type (e.g., one of running, cycling, swimming, hiking, walking), a desired distance, and one or more desired preferences (e.g., a desired elevation) associated with the route.

At 804, a recommended route is generated for the activity in response to the request using a diffusion machine learning model, wherein the diffusion machine learning model is trained to generate routes based at least in part on a plurality of recorded user activities.

In response to a request to generate a recommended route, a cropped image of a reference map is generated based on the parameters of the request. In some embodiments, a cropped reference map image is generated for the request based on at least the desired start location that is included in the request. In some embodiments, a cropped reference map image is generated for the request at inference time in a manner similar to how a cropped reference map image is generated for a selected recorded user activity data at training time. An example process of generating a cropped reference map image for a route recommendation request is shown in FIG. 10, below. The cropped image of the reference map is then provided as input along with a set of ordered route points, starting with a set of ordered route points of pure noise in the first step of inference, to the diffusion machine learning model (e.g., a diffusion transformer model) for the model to output a predicted noise vector. As will be described in further detail below, the predicted noise vector output from one step of inference is used to denoise the noised set of ordered route points from that same step, and the resulting denoised set of ordered route points is to be fed into the model in the next step of inference, and so forth, until a desired number of steps of inference are performed and/or some other stop condition is met. The set of ordered route points that is determined/output based on the predicted noise vector from the last step of inference is a compact/simplified representation of a recommended route.

FIG. 9 is a flow diagram showing an example of a process for performing inference with a diffusion machine learning model for route recommendation in accordance with some embodiments. In some embodiments, process 900 may be implemented, at least in part, by generative route recommendation server 208 of FIG. 2. In some embodiments, process 800 of FIG. 8 may be implemented, at least in part, using process 900.

Process 900 describes an example process of running multiple steps of inference starting with a set of random noise ordered route points on a cropped reference map image that is created for this request to ultimately generate a recommended route representation.

At 902, a request to generate a recommended route is received.

At 904, parameters of the request are used to generate a cropped map image from a reference map. As mentioned above, example parameters that may be included in the request may include one or more of the following: a desired start location, a desired activity type (e.g., one of running, cycling, swimming, hiking, walking), a desired distance, and one or more desired preferences (e.g., a desired elevation) associated with the route.

At 906, the cropped map image is divided into a set of global patches.

At 908, for an initial step of inference of a diffusion transformer model, a set of pure noise route points within the cropped map image is generated. In the first step of inference for this request, a predetermined number of ordered route points (where the predetermined number is associated with a compact representation of a route, e.g., 64 route points) of pure noise on the cropped map image is generated. Put another way, the predetermined number of ordered pure noise route points is a predetermined number (e.g., 64) of random points among the normalized 2D coordinate system of the cropped map image that are also assigned respective index values (e.g., unique whole numbers in the range of [0, 63]) that denote their sequence in the set.

At 910, the set of pure noise route points is set as a noised input set of predicted route points corresponding to a current step. Another way of referring to the pure noise route points of this first step is that the added noise level at this first step is 1 (on a scale of 0 to 1, where 1 represents all noise (and no actual value) and 0 represents all actual value (and no noise)).

At 912, sets of tokens are derived from at least the set of global patches and the noised input set of predicted ordered route points. For example, such sets of tokens can be determined using a process such as process 600 of FIG. 6. In some embodiments, if token(s) derived from the set of global patches have been previously generated, then those tokens do not need to be generated again because the cropped map image and the global patches thereof do not change from step to step. However, tokens associated with the noised input set of predicted ordered route points need to be regenerated at each new step of inference because the route points change from step to step.

At 914, the sets of tokens are input into the diffusion transformer model.

At 916, a predicted noise vector corresponding to the current step is obtained from the diffusion transformer model. The predicted noise vector that is output by the diffusion transformer model is the noise level that the model has predicted to have been added to the input set of route points.

At 918, an output set of predicted ordered route points corresponding to the current step is determined based on the noised input set of predicted ordered route points and the predicted noise vector corresponding to the current step. The resulting set of predicted ordered route points (that represent a route) that is output from the current step is determined by subtracting the predicted noise vector corresponding to the current step from the noised input set of predicted ordered route points corresponding to the current step.

At 920, whether there is at least one more step of inference to be performed for the request is determined. In the event that there is at least one more step of inference to be performed for the request, control is transferred to 922.

Otherwise, in the event that there are no more steps of inference to be performed for the request, control is transferred to 928. Whether a next step of inference is to be performed for the request can be determined based on a set of stop criteria. One example stop criterion is that a desired number of steps of inference have already been performed for the request for route recommendation. Examples of the desired number of steps of inference to be performed for the request are 10 or 100 steps. The tradeoff between more steps and less steps is cost and accuracy of the route prediction/recommendation.

At 922, a (next) current step is started. Put another way, to "start" a new step is to consider the just completed last step as the "previous" step and the new step as the new "current" step.

At 924, the output set of predicted ordered route points corresponding to the previous step is set as an input set of predicted ordered route points corresponding to the current step. Put another way, the output set of predicted ordered route points from the previous step (step N-1) is the input into the current step (step N).

At 926, a new noise level associated with the current step is added to the input set of predicted ordered route points corresponding to the current step. In various embodiments, in each successive step of inference for a request for route recommendation, a lower noise level is added to the input set of predicted ordered route points corresponding to the current step than was added to the input set of predicted ordered route points at the previous step. For example, if the noise level that was added in the previous step (step N-1) was 0.9 (meaning that 0.9 of the actual value was discarded and the remaining 0.1 was combined with noise), then the noise level that is to be added in the current step (step N) should be a value less than 0.9.

At 928, the output set of predicted ordered route points corresponding to the current step is determined as a recommended route representation. After the last step is determined to have been performed, the output set of predicted ordered route points corresponding to that step is determined as the recommended route representation. As mentioned above, the recommended route representation still comprises a predetermined number (e.g., 64) of predicted ordered route points that (e.g., sparsely) describe the shape of a route. As will be described in FIG. 15 below, the recommended route representation can be converted into a full route prior to being presented at a user interface.

FIG. 10 is a flow diagram showing an example of a process for generating a cropped image of a reference map corresponding to a recommendation route request by running a diffusion transformer model at inference in accordance with some embodiments. In some embodiments, process 1000 may be implemented, at least in part, by generative route recommendation server 208 of FIG. 2. In some embodiments, step 904 of process 900 of FIG. 9 may be implemented using process 1000.

Process 1000 is similar to process 500 of FIG. 5 except that process 1000 is implemented to generate a cropped image of a reference at inference time and process 500 of FIG. 5 is implemented to generate a cropped image of a reference at training time.

At 1002, an indication to generate a crop of reference map corresponding to a recommendation route request is received, wherein the recommendation route request includes at least a desired start location, a desired distance, and a desired activity type.

At 1004, a reference map is determined based on the activity type. In some embodiments, a stored reference map that is associated with the same activity type that was included in the request is selected.

At 1006, dimensions of a cropped map image are determined based on a desired distance. In some embodiments, each dimension (e.g., the length and width) of the cropped map image is determined as a function of the desired distance that was included in the request. In one example, the length and width of the cropped map image are each equal to (e.g., or longer than) the desired distance that was included in the request.

At 1008, a center of the cropped map image is determined based on the desired start location associated with the GPS data. A square of the determined dimensions of the cropped map image is placed over the reference map and in a manner that is centered on the desired start location that was included in the request.

At 1010, the cropped map image is generated from the reference map based on the determined dimensions and the determined center. For example, if the desired distance were one mile, then the cropped image of the reference map would be a one mile by one mile square that is centered on the desired start location. Similar to a cropped image of the reference map generated at training, a cropped image of the reference map generated at inference time is also on the normalized 2D coordinate system.

Figure 11:
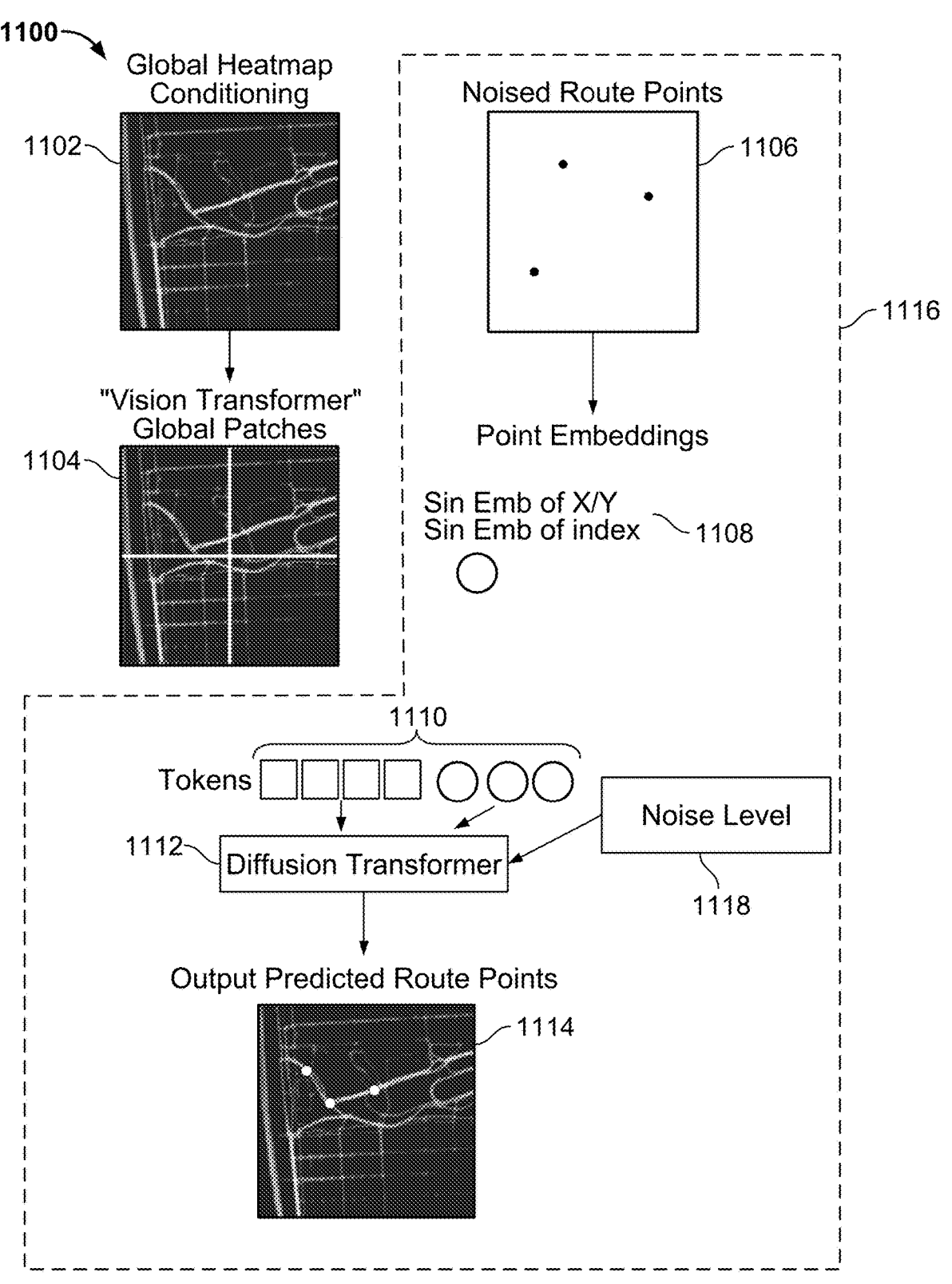
FIG. 11 is a diagram showing an example diagram of performing inference with the generative (diffusion transformer) model for route generation in accordance with some embodiments.

FIG. 11 is a diagram showing an example diagram of performing inference with the generative (diffusion transformer) model for route generation in accordance with some embodiments. In some embodiments, process 1100 shows one or more steps of performing inference with a diffusion transformer model as described in process 900 of FIG. 9. In various embodiments, after cropped reference map image 1102 for a request for recommended routes has been generated (e.g., using a process such as process 1000 of FIG. 10), cropped reference map image 1102 is divided into (e.g., 64) non-overlapping global patches 1104. As will be described below, in some embodiments, global patches 1104 are to be used with multiple (e.g., M, where M is a configured value between 10 and 100, for example) steps of performing inference with the model to generate a representation of a recommended route in response to a request.

In the example of FIG. 11, assume that N represents the instance of a step of inference for a given request. For the first step (N=1) of the trained diffusion transformer model corresponding to the request, noised route points 1106 is determined. In particular, in some embodiments, at the first step (N=1), noised route points 1106 comprises a vector of a predetermined number of (e.g., 64) points that are each initialized at the center (e.g., (0, 0)) of the normalized 2D coordinate system of the reference map crop and then noise level 1118 is added to each point (across both the X and Y dimensions of the point) in the vector. At this first step (N=1), noise level 1118 comprises pure noise such that noised route points 1106 comprises 64 ordered points of pure noise. Noised route points 1106 are converted into sinusoidal point embedding 1108 of higher dimensions. Then, features of global patches 1104 and sinusoidal point embeddings 1108 are included in tokens 1110 (e.g., using a process such as process 600 of FIG. 6), which are provided to diffusion transformer model 1112 to prompt diffusion transformer model 1112 to output the first step's (N=1) predicted noise vector (not shown in FIG. 11). The predicted noise vector at step N=1 is then subtracted from the input, noised ordered points 1106 corresponding to N=1 (a vector of pure noise), to determine a vector of points in the normalized 2D coordinate system to represent the first step's (N=1) output set of predicted ordered route points 1114.

Given that at step N=1, noised route points 1106 comprises a predetermined number (e.g., 64) of pure noise ordered points or random points, even after the removal/subtraction of the predicted noise vector output by diffusion transformer model 1112, the resulting predicted route as represented by the resulting vector of ordered points is unlikely to resemble a real/usable route (e.g., that sufficiently aligns with edges within the provided reference map crop). As such, the portions of FIG. 11 that are included in section 1116 are iterated over multiple steps/rounds (N=2, 3, . . . ) until a stop criterion is met or the number of steps equals a desired value, M (i.e., N=M). For example, M may be configured to equal a value between 10 to 100. The selection for M depends on the desired cost/resource usage, where a higher M will incur a higher cost and a slower route generation but a more accurate final predicted ordered route and where a lower M will incur a lower cost and a faster route generation but a comparatively less accurate final predicted ordered route.

For the second step (N=2) of the trained diffusion transformer model corresponding to the request, the set of route points that is input into this second step is initially set to equal output set of predicted ordered route points 1114 output from the previous step (N=1). As described above, output set of predicted ordered route points 1114 that was determined from the previous step (N=1) is the vector of ordered points that was determined by subtracting the noise vector predicted by diffusion transformer model 1112 during the previous step (N=1) from the instance of noised route points 1106 from the previous step (N=1) (i.e., 64 pure noise points). In particular, in some embodiments, at the second step (N=2), a smaller noise level 1118 than the amount of noise that was added in step N=1 is added to the input set of route points into the second step (N=2) to determine noised route points 1106 for the second step (N=2). Noised route points 1106 of this second step (N=2) are converted into sinusoidal point embeddings 1108 of higher dimensions. Then, features of global patches 1104 and sinusoidal point embeddings 1108 are included in tokens 1110, which are provided to diffusion transformer model 1112 to prompt diffusion transformer model 1112 to output the second step's (N=2) predicted noise vector (not shown in FIG. 11). The predicted noise vector at step N=2 is then subtracted from noised ordered points 1106 from N=2 to determine a vector of points in the normalized 2D coordinate system to represent the second step's (N=2) output set of predicted ordered route points 1114.

For the third step (N=3) of the trained diffusion transformer model corresponding to the request, the set of route points that is input into this third step is initially set to equal output set of predicted ordered route points 1114 output from the previous step (N=2). As described above, output set of predicted ordered route points 1114 that was determined from the previous step (N=2) is the vector of ordered points that was determined by subtracting the noise vector predicted by diffusion transformer model 1112 during the previous step (N=2) from the instance of noised route points 1106 from the previous step (N=2). In particular, in some embodiments, at the third step (N=3), a smaller noise level 1118 than the amount of noise that was added in step N=2 is added to the input set of route points into the third step (N=3) to determine noised route points 1106 for the third step (N=3). Noised route points 1106 are converted into sinusoidal point embeddings 1108 of higher dimensions. Then, features of global patches 1104 and sinusoidal point embeddings 1108 are included in tokens 1110, which are provided to diffusion transformer model 1112 to prompt diffusion transformer model 1112 to output the third step's (N=3) predicted noise vector (not shown in FIG. 11). The predicted noise vector at step N=3 is then subtracted from noised ordered points 1106 from N=3 to determine a vector of points in the normalized 2D coordinate system to represent the third step's (N=3) output set of predicted ordered route points 1114.

These steps continue until N=M steps have been completed or another stop criterion is met. The last instance of output set of predicted ordered route points 1114 that is generated when the stop criterion is met (e.g., after N=M steps have been completed) is then returned as the representation of the "recommended route" corresponding to the request. The representation of the "recommended route" corresponding to the request comprises a predetermined number (e.g., 64) of ordered points (e.g., waypoints) in the normalized 2D coordinate system of the corresponding cropped image of a reference map.

Intuitively, over M steps of inference for a given request, diffusion transformer model 1112 will iteratively move the noised route (ordered) points (in the normalized coordinate system) from their original, random locations such that the predicted ordered route points will be moved closer and closer to locations of actual edges within the corresponding reference map crop. If the reference map were a heat map, then the cropped map image provides context of actual historical usage/popularity of activities on their locations. If the reference map were a base map, then the cropped map image provides context of existing roads/trails/paths that are legal/permitted for users to traverse.

FIG. 12 includes six diagrams that show examples of six respective sets of predicted ordered route points that are output from six different steps of inference with the diffusion transformer model in response to a route recommendation request. For example, each set of output sets of predicted ordered route points 1202, 1204, 1206, 1208, 1210, and 1212 is generated during a process such as process 900 of FIG. 9. In particular, FIG. 12 shows six instances (1202, 1204, 1206, 1208, 1210, and 1212) of a cropped reference map image that were generated based on the parameter(s) of the route recommendation request. Each instance (1202, 1204, 1206, 1208, 1210, and 1212) of a cropped reference map image is shown to be overlaid with the set of output sets of predicted ordered route points that is output by a respective step of inference. For example, the output sets of predicted ordered route points shown across instances 1202, 1204, 1206, 1208, 1210, and 1212 of the cropped reference map image are generated during a process such as process 900 of FIG. 9. Furthermore, the output sets of predicted ordered route points shown across instances 1202, 1204, 1206, 1208, 1210, and 1212 of the cropped reference map image are output by increasingly greater steps of inference. For example, the sets of predicted ordered route points shown across instances 1202, 1204, 1206, 1208, 1210, and 1212 of the cropped reference map image are output respectively by step N=1, 10, 20, 30, 60, and 80. As described above, at the first step (N=1), the noised set of route points that is fed into the diffusion transformer model is completely random points across the normalized 2D coordinate system of the cropped reference map image and as such, in an instance of cropped reference map image 1202, the corresponding output set of predicted ordered route points (even though they have been denoised based on the noise predicted by the model) does not adhere to the edges shown in instances of cropped reference map image 1202. After several more steps have been performed and where each step improves upon the prediction from the previous step, the output set of predicted ordered route points from step N=30 that is shown at cropped reference map image 1208 has moved closer to edges that appear within the cropped reference map image 1208. Then, after even more steps have been performed, the output set of predicted ordered route points from step N=80 that is shown at cropped reference map image 1212 fully aligns with edges that appear within the cropped reference map image 1212. For example, if step N=80 were the last step of inference that is performed for the request, then the output set of predicted ordered route points from step N=80 that is shown at cropped reference map image 1212 will be the representation of one recommended route corresponding to the request.

FIG. 13 includes six diagrams that show examples of six respective sets of predicted ordered route points that are output from six different steps of inference with the diffusion transformer model in response to a route recommendation request. In comparison to the diagrams of FIG. 12, the diagrams of FIG. 13 show a different cropped reference map image because it was generated for a different route recommendation request with different parameters (e.g., a desired start location and/or desired distance) than those of the route recommendation request of FIG. 12. For example, each set of output sets of predicted ordered route points 1302, 1304, 1306, 1308, 1310, and 1312 is generated during a process such as process 900 of FIG. 9. In particular, FIG. 13 shows six instances (1302, 1304, 1306, 1308, 1310, and 1312) of a cropped reference map image that was generated based on the parameter(s) of the route recommendation request. Each instance (1302, 1304, 1306, 1308, 1310, and 1312) of a cropped reference map image is shown to be overlaid with the set of output sets of predicted ordered route points that is output by a respective step of inference. For example, the output sets of predicted ordered route points shown across instances 1302, 1304, 1306, 1308, 1310, and 1312 of the cropped reference map image are generated during a process such as process 900 of FIG. 9. Furthermore, the output sets of predicted ordered route points shown across instances 1302, 1304, 1306, 1308, 1310, and 1312 of the cropped reference map image are output by increasingly greater steps of inference. For example, the sets of predicted ordered route points shown across instances 1302, 1304, 1306, 1308, 1310, and 1312 of the cropped reference map image are output respectively by step N=1, 10, 20, 30, 60, and 80. As described above, at the first step (N=1), the noised set of route points that are fed into the diffusion transformer model are completely random points across the normalized 2D coordinate system of the cropped reference map image and as such, in an instance of cropped reference map image 1302, the corresponding output set of predicted ordered route points (even though they have been denoised based on the noise predicted by the model) does not adhere to the edges shown in the instance of cropped reference map image 1302. After several more steps have been performed and where each step improves upon the prediction from the previous step, the output set of predicted ordered route points from step N=30 that is shown at cropped reference map image 1308 has moved closer to edges that appear within the cropped reference map image 1308. Then, after even more steps have been performed, the output set of predicted ordered route points from step N=80 that is shown at cropped reference map image 1312 fully aligns with edges that appear within the cropped reference map image 1312. For example, if step N=80 was the last step of inference that is performed for the request, then the output set of predicted ordered route points from step N=80 that is shown at cropped reference map image 1312 will be the representation of one recommended route corresponding to the request.

In general, the diagrams across FIGS. 12 and 13 show that as increasing greater steps of inference are performed for a single route recommendation request, the original noised (e.g., random) route points at the first step that are initially input into the model are progressively moved by the model to align with actual edges within the provided reference map crop such that at run N=80, the model is able to output a respective representation of a recommended route of an arbitrary shape but that one is constrained to closely match the actual paths (e.g., and encoded degree of historical user) within the context of the provided cropped reference map.

FIG. 14 is a flow diagram showing an example process for generating a final route from a representation of a recommended route in accordance with some embodiments. In some embodiments, process 1400 may be implemented, at least in part, by generative route recommendation server 208 of FIG. 2.

At 1402, a recommended route representation is received. In some embodiments, the representation of the recommended route comprises a set of a predetermined number (e.g., 64) of ordered route points on a normalized 2D coordinate system and that was output from the last step of inference performed by a diffusion transformer model in response to a request (e.g., using a process such as process 900 of FIG. 9).

At 1404, the recommended route representation is translated into a corresponding set of GPS data points. In some embodiments, in converting the representation of the recommended route into a final route object, the predetermined number of ordered points (e.g., with indices from 0 to 63) on the normalized 2D coordinate system is then converted back into respective latitudinal/longitudinal (lat/lng) points on the original latitude/longitude coordinate system of the reference map from which the cropped image corresponding to the request was generated.

At 1406, the set of GPS data points is expanded to a GPS track associated with a recommended route. In some embodiments, the set of lat/lng points of the recommended route are then mapped/aligned/snapped onto actual edges within the original reference map. In some embodiments, additional GPS data points are added between the converted set of lat/lng points in the final route object, which includes the GPS data associated with the recommended route. In some embodiments, rather than using alignment, point to point routing from waypoint to waypoint can also be used and where the order of the waypoints to visit from the set is determined based on the order/index value (e.g., from 0 to 63) of the recommended route points. The machine learning routing model (which is a different model from the diffusion transformer model) here would simply allow for a variable number of waypoints that might be selected with, and lean heavily on the routing engine to complete paths between them. This would still be a valuable improvement, because the machine learning routing model could pick waypoints that are topologically more diverse and closer to an ideal route given the surroundings, rather than an always loop.

At 1408, a visualized path corresponding to a recommended route is presented on a map at a user interface. The result of generating a full route/final route object (comprising GPS data that substantially align with edges of a reference map) from a representation of a recommended route is that the final route object can be presented at a map that is output at a user interface, for example.

FIG. 15 is a diagram showing an example presentation of a recommended full route generated using a generative model at a user interface in accordance with some embodiments. As shown in FIG. 15, full route 1502 (e.g., that was generated, at least in part, using a process such as process 1400 of FIG. 14), includes an indicated direction, is presented in a manner that overlaps a corresponding map of the relevant region. This presentation serves as a preview of a recommended path that the user/athlete can potentially traverse during a hypothetical/future activity.

In one example use case, recommended routes are desired to be generated (as "ephemeral routes") on the fly and are desired to be unbounded in quantity so that they can be presented/suggested at user interfaces of an activity tracking application for various athletes/users. For example, on the order of 1 million recommended routes a day may be desired to be generated for this example use case. Therefore, using the generative model described herein, any number of recommended routes of arbitrary shapes and matching the desired preferences of the user can be efficiently generated to meet this need.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

store recorded user activities;

receive a request to generate a route recommendation for an activity, wherein the request includes: a desired start location, a desired distance, a desired activity type, and a desired elevation; and generate a recommended route for the activity in response to the request using a diffusion machine learning model, wherein the diffusion machine learning model is trained to generate routes based at least in part on the recorded user activities, including to:

receive an indication to generate a crop of a reference map corresponding to the request;

determine the reference map based on the desired activity type;

determine dimensions of a cropped map image based on the desired distance;

determine a center of the cropped map image on the reference map based on the desired start location;

generate the cropped map image from the reference map based on the determined dimensions and the determined center;

associate the cropped map image with a normalized two-dimensional (2D) coordinate system;

determine an initial set of pure noise ordered route points corresponding to a first step;

provide first sets of tokens derived from the initial set of pure noise ordered route points and the cropped map image to the diffusion machine learning model to obtain a first predicted noise vector from the diffusion machine learning model;

determine a first output set of predicted ordered route points based at least in part on subtracting the first predicted noise vector from the initial set of pure noise ordered route points;

determine a noised input set of predicted ordered route points corresponding to a new step based at least in part on adding a determined noise vector into the first output set of predicted ordered route points;

provide a second set of tokens derived from the noised input set of predicted ordered route points and the cropped map image to the diffusion machine learning model to obtain a second predicted noise vector from the diffusion machine learning model; and determine a second output set of predicted ordered route points based at least in part on subtracting the second predicted noise vector from the noised input set of predicted ordered route points; and one or more memories coupled to the one or more processors and are configured to provide the one or more processors with instructions.

2. The system of claim 1, wherein the activity is associated with an activity type that comprises a run, a walk, a bike ride, a hike, or a swim.

3. The system of claim 1, wherein the one or more processors are further configured to train the diffusion machine learning model including to select a reference user activity that meets a set of criteria for serving as training data.

4. The system of claim 3, wherein the indication comprises a first indication, wherein the crop comprises a first crop, wherein the reference map comprises a first reference map, wherein the cropped map image comprises a first cropped map image, wherein the center comprises a first center, wherein the determined center comprises a determined first center, wherein the training of the diffusion machine learning model further includes to:

receive a second indication to generate a second crop of a second reference map corresponding to the reference user activity, wherein the indication includes at least Global Positioning System (GPS) data associated with the reference user activity and an activity type associated with the reference user activity;

determine the second reference map based on the activity type;

determine dimensions of a second cropped map image based on a distance determined from the GPS data;

determine a second center of the second cropped map image on the second reference map based on a start location associated with the GPS data;

generate the second cropped map image from the second reference map based on the determined dimensions and the determined second center; and associate the second cropped map image with the normalized 2D coordinate system.

5. The system of claim 4, wherein the training of the diffusion machine learning model further includes to:

determine a reference set of a predetermined number of ordered route points from geographical information associated with the reference user activity, wherein the reference set of the predetermined number of ordered route points comprises points within the normalized 2D coordinate system.

6. The system of claim 5, wherein the training of the diffusion machine learning model further includes to:

add a known noise vector into the reference set of the predetermined number of ordered route points to generate a noised reference set of the predetermined number of ordered route points;

provide a set of tokens derived from the noised reference set of the predetermined number of ordered route points and the second cropped map image to the diffusion machine learning model to obtain a predicted noise vector; and update parameters of the diffusion machine learning model based at least in part on a loss function determined based on a comparison between the predicted noise vector and the known noise vector.

7. The system of claim 6, wherein the training of the diffusion machine learning model further includes to:

receive the second cropped map image and the noised reference set of the predetermined number of ordered route points;

derive a third set of tokens from the noised reference set of the predetermined number of ordered route points, wherein each token from the third set of tokens is derived from a respective two-dimensional pixel coordinate and a respective index value corresponding to a respective ordered route point;

receive a set of global patches divided from the second cropped map image; and derive a fourth set of tokens from the set of global patches, wherein each token from the fourth set of tokens is derived from pixel values corresponding to a respective global patch.

8. The system of claim 1, wherein the reference map comprises a heat map corresponding to the desired activity type.

9. The system of claim 1, wherein the reference map comprises a base map.

10. The system of claim 1, wherein the recommended route generated by the diffusion machine learning model comprises a set of a predetermined number of ordered route points in the normalized 2D coordinate system.

11. The system of claim 10, wherein the one or more processors are further configured to:

translate the set of the predetermined number of ordered route points into a set of Global Positioning System (GPS) data points;

expand the set of GPS data points to a GPS track associated with the recommended route; and present a visualized path corresponding to the recommended route on a map at a user interface.

12. A method, comprising:

storing recorded user activities;

receiving a request to generate a route recommendation for an activity, wherein the request includes: a desired start location, a desired distance, a desired activity type, and a desired elevation; and generating a recommended route for the activity in response to the request using a diffusion machine learning model, wherein the diffusion machine learning model is trained to generate routes based at least in part on the recorded user activities, including by:

receiving an indication to generate a crop of a reference map corresponding to the request;

determining the reference map based on the desired activity type;

determining dimensions of a cropped map image based on the desired distance;

determining a center of the cropped map image on the reference map based on the desired start location;

generating the cropped map image from the reference map based on the determined dimensions and the determined center;

associating the cropped map image with a normalized two-dimensional (2D) coordinate system;

determining an initial set of pure noise ordered route points corresponding to a first step;

providing first sets of tokens derived from the initial set of pure noise ordered route points and the cropped map image to the diffusion machine learning model to obtain a first predicted noise vector from the diffusion machine learning model;

determining a first output set of predicted ordered route points based at least in part on subtracting the first predicted noise vector from the initial set of pure noise ordered route points;

determining a noised input set of predicted ordered route points corresponding to a new step based at least in part on adding a determined noise vector into the first output set of predicted ordered route points;

providing a second set of tokens derived from the noised input set of predicted ordered route points and the cropped map image to the diffusion machine learning model to obtain a second predicted noise vector from the diffusion machine learning model; and determining a second output set of predicted ordered route points based at least in part on subtracting the second predicted noise vector from the noised input set of predicted ordered route points.

13. The method of claim 12, wherein the activity is associated with an activity type that comprises a run, a walk, a bike ride, a hike, or a swim.

14. The method of claim 12, further comprising training the diffusion machine learning model including selecting a recorded a reference user activity that meets a set of criteria for serving as training.

15. The method of claim 14, wherein the indication comprises a first indication, wherein the crop comprises a first crop, wherein the reference map comprises a first reference map, wherein the reference map comprises a first reference map, wherein the cropped map image comprises a first cropped map image, wherein the center comprises a first center, wherein the determined center comprises a determined first center, wherein the training the diffusion machine learning model further includes:

receiving a second indication to generate a second crop of a second reference map corresponding to the reference user activity, wherein the indication includes at least Global Positioning System (GPS) data associated with the reference user activity and an activity type associated with the reference user activity;

determining the second reference map based on the activity type;

determining dimensions of a second cropped map image based on a distance determined from the GPS data;

determining a second center of the second cropped map image on the second reference map based on a start location associated with the GPS data;

generating the second cropped map image from the second reference map based on the determined dimensions and the determined second center; and associating the second cropped map image with the normalized 2D coordinate system.

16. The method of claim 15, wherein the training of the diffusion machine learning model further includes:

determining a reference set of a predetermined number of ordered route points from geographical information associated with the reference user activity, wherein the reference set of the predetermined number of ordered route points comprises points within the normalized 2D coordinate system.

17. A system, comprising:

one or more processors configured to:

store recorded user activities;

train a diffusion machine learning model to generate routes based at least in part on the recorded user activities, including to:

select a reference user activity that meets a set of criteria for serving as training data;

receive an indication to generate a crop of a reference map corresponding to the reference user activity, wherein the indication includes at least Global Positioning System (GPS) data associated with the reference user activity and an activity type associated with the reference user activity;

determine the reference map based on the activity type;

determine dimensions of a cropped map image based on a distance determined from the GPS data;

determine a center of the cropped map image on the reference map based on a start location associated with the GPS data;

generate the cropped map image from the reference map based on the determined dimensions and the determined center;

associate the cropped map image with a normalized two-dimensional (2D) coordinate system;

determine a reference set of a predetermined number of ordered route points from geographical information associated with the reference user activity, wherein the reference set of the predetermined number of ordered route points comprises points within the normalized 2D coordinate system;

add a known noise vector into the reference set of the predetermined number of ordered route points to generate a noised reference set of the predetermined number of ordered route points;

provide a set of tokens derived from the noised reference set of the predetermined number of ordered route points and the cropped map image to the diffusion machine learning model to obtain a predicted noise vector;

update parameters of the diffusion machine learning model based at least in part on a loss function determined based on a comparison between the predicted noise vector and the known noise vector;

receive the cropped map image and the noised reference set of the predetermined number of ordered route points;

derive a first set of tokens from the noised reference set of the predetermined number of ordered route points, wherein each token from the first set of tokens is derived from a respective two-dimensional pixel coordinate and a respective index value corresponding to a respective ordered route point;

receive a set of global patches divided from the cropped map image; and derive a second set of tokens from the set of global patches, wherein each token from the second set of tokens is derived from pixel values corresponding to a respective global patch;

receive a request to generate a route recommendation for an activity; and generate a recommended route for the activity in response to the request using the diffusion machine learning model.

* * * * *